United States Patent
Kumbi et al.

(10) Patent No.: US 11,775,813 B2
(45) Date of Patent: Oct. 3, 2023

(54) GENERATING A RECOMMENDED TARGET AUDIENCE BASED ON DETERMINING A PREDICTED ATTENDANCE UTILIZING A MACHINE LEARNING APPROACH

(71) Applicant: Adobe Inc., San Jose, CA (US)

(72) Inventors: Niranjan Kumbi, Fremont, CA (US); Vaidyanathan Venkatraman, Fremont, CA (US); Rajan Madhavan, Foster City, CA (US); Omar Rahman, San Jose, CA (US); Kai Lau, Seattle, WA (US); Badsah Mukherji, Palo Alto, CA (US); Ajay Awatramani, Fremont, CA (US)

(73) Assignee: Adobe Inc., San Jose, CA (US)

( * ) Notice: Subject to any disclaimer, the term of this patent is extended or adjusted under 35 U.S.C. 154(b) by 999 days.

(21) Appl. No.: 16/446,386

(22) Filed: Jun. 19, 2019

(65) Prior Publication Data

US 2020/0401880 A1 Dec. 24, 2020

(51) Int. Cl.
*G06Q 10/04* (2023.01)
*G06Q 30/0202* (2023.01)
(Continued)

(52) U.S. Cl.
CPC .............. *G06N 3/08* (2013.01); *G06Q 10/04* (2013.01); *G06Q 30/0202* (2013.01); *G06N 20/00* (2019.01)

(58) Field of Classification Search
CPC .......................... G06Q 30/0202; G06Q 10/04
See application file for complete search history.

(56) References Cited

U.S. PATENT DOCUMENTS 10,157,371 B2 * 12/2018 Narayanan ......... G06Q 10/1095
10,454,854 B2 * 10/2019 Malik .................... H04L 65/403
(Continued)

FOREIGN PATENT DOCUMENTS

CN       105809554 B  *  7/2016  ......... G06F 16/9535
WO    WO-0137113 A2  *  5/2001  ............. G06Q 30/02

OTHER PUBLICATIONS

Lira, "Event attendance classification in social media" (Year: 2019).*

(Continued)

*Primary Examiner* — Sangeeta Bahl
(74) *Attorney, Agent, or Firm* — Keller Preece PLLC

(57) ABSTRACT

The present disclosure relates to systems, methods, and non-transitory computer readable media for generating a recommended target audience based on determining a predicted attendance utilizing a neural network approach. For example, the disclosed systems can utilize an approximate nearest neighbor algorithm to identify individuals that are within a similarity threshold of invitees for an event. In addition, the disclosed systems can implement an attendance prediction model to determine a probability of an invitee attending the event. The disclosed systems can further determine a predicted attendance for an event based on the individual probabilities. Based on identifying the similar individuals to, and the attendance probabilities for, the invitees, the disclosed systems can generate a recommended target audience to satisfy a target attendance for an event based on a predicted attendance for the event.

20 Claims, 11 Drawing Sheets

(51) Int. Cl.
*G06N 3/08* (2023.01)
*G06N 20/00* (2019.01)

(56) References Cited

U.S. PATENT DOCUMENTS

| | | | | |
|---|---|---|---|---|
| 10,477,416 | B2* | 11/2019 | Bhorkar | H04L 47/70 |
| 10,878,143 | B2* | 12/2020 | Hoffman | G06Q 50/01 |
| 2013/0332231 | A1* | 12/2013 | Pickton | G06Q 30/0202 |
| | | | | 705/7.31 |
| 2014/0047045 | A1* | 2/2014 | Baldwin | G06Q 20/384 |
| | | | | 707/738 |
| 2014/0089320 | A1* | 3/2014 | Baldwin | G06F 16/9535 |
| | | | | 707/748 |
| 2018/0107988 | A1* | 4/2018 | Codella | G06Q 10/1095 |
| 2018/0214772 | A1* | 8/2018 | Walsh | A63F 13/795 |
| 2019/0108438 | A1* | 4/2019 | Torres | G06N 20/20 |

OTHER PUBLICATIONS

Yu, "Predicting activity attendance in event based social networks" (Year: 2014).*

* cited by examiner

GENERATING A RECOMMENDED TARGET AUDIENCE BASED ON DETERMINING A PREDICTED ATTENDANCE UTILIZING A MACHINE LEARNING APPROACH

BACKGROUND

Advancements in software and hardware platforms have led to a variety of improvements in systems that provide targeted digital communications to client devices. For example, digital communication distribution systems are now able to provide digital communications to many different client devices across computer networks based on various goals to move prospects through an interaction funnel including various stages such as awareness, interest, consideration, intent, evaluation, and purchase. Indeed, some systems can distribute digital communications for events of various types—in-person events, executive roundtables, trade shows, and webinars—to influence prospects through the interaction funnel toward a purchase.

Despite these advances however, conventional digital communication distribution systems continue to suffer from a number of disadvantages, particularly in their accuracy, efficiency, and flexibility. Indeed, conventional systems inaccurately distribute digital communications to client devices of prospects by utilizing broad-based targeting techniques. For example, conventional systems often rely on targeting large numbers of prospects based on generic industry standard thresholds. These systems thus distribute digital communications to invite prospects to events in a broad sweep, with the general understanding that industry standards indicate that, on average, only a certain percentage of prospects who receive the digital communications will attend the event. In addition, many conventional systems are inaccurate in that the systems often fail to meet a particular event-related goal (e.g., a number of attendees or registrants) due at least in part to the non-specific nature of broad-based targeting, which in turn, results in higher churn.

As another disadvantage, conventional digital content distribution systems are inefficient. In particular, many conventional systems inefficiently utilize computer resources such as computing time and computing power. To elaborate, due at least in part to the inaccuracy of these conventional systems, these systems often waste computer resources in generating and distributing digital communications to client devices of prospects that have a low probability of attending an event. Indeed, many conventional systems generate large amounts of spam communications that waste computing power and computing time by generating and distributing an ordinate number of digital communications with little or no chance of producing a result.

As yet another disadvantage of conventional digital communication distribution systems, many conventional systems are inflexible. To illustrate, many conventional systems are too slow to adapt to changing circumstances. For instance, in some cases, a conventional system distributes too few digital communications to achieve a desired result for an event and is unable to adjust the distribution of the digital communications using broad-based targeting techniques in time to fix the problem. Additionally, many conventional systems are rigidly fixed to achieving a particular result (e.g., a number of attendees for an event) based on industry standard thresholds, irrespective of prospect attributes or characteristics. These conventional systems cannot therefore adapt to distribute digital communications to achieve different event-based goals based on varying attributes associated with prospects to invite to attend an event.

Finally, conventional systems are typically reactive and slow. In particular, after sending invitations to a large number of potential attendees, conventional systems typically wait for responses to determines how many invitees plan on attending. For example, after waiting weeks for responses to invitations, a marketer may determine that too few have accepted or registered for the event. At this point, conventional systems require reaction to the low registrations. Unfortunately, reacting at this point can result in even more inefficient targeting and wasting of resources and often does not result in reaching a desired attendance.

Thus, there are several disadvantages with regard to conventional digital communication distribution systems.

SUMMARY

One or more embodiments described herein provide benefits and solve one or more of the foregoing or other problems in the art with systems, methods, and non-transitory computer readable media that generate a recommended target audience for an event based on determining a predicted attendance for the event utilizing a neural network approach. For instance, the systems can generate an expanded list of an audience in order to achieve and/or improve various key performance indices (KPIs) such as an expected attendance or registration for an event and a ratio between invitees and attendees/registrants for the event. To achieve these KPIs, the disclosed systems can use a defined target goal (e.g., a target attendance or a target registration) for an event in combination with artificial intelligence and machine learning techniques to generate a recommended target audience for the event. For example, the disclosed systems can take proactive action to determine a likelihood or probability of invitees attending (or registering for) an event. In addition, the disclosed systems can generate a probable or predicted attendance (or registration) for the event. In some embodiments, the disclosed systems further generate a recommended target audience as a list expanded from current invitees to achieve or improve one or more KPIs.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
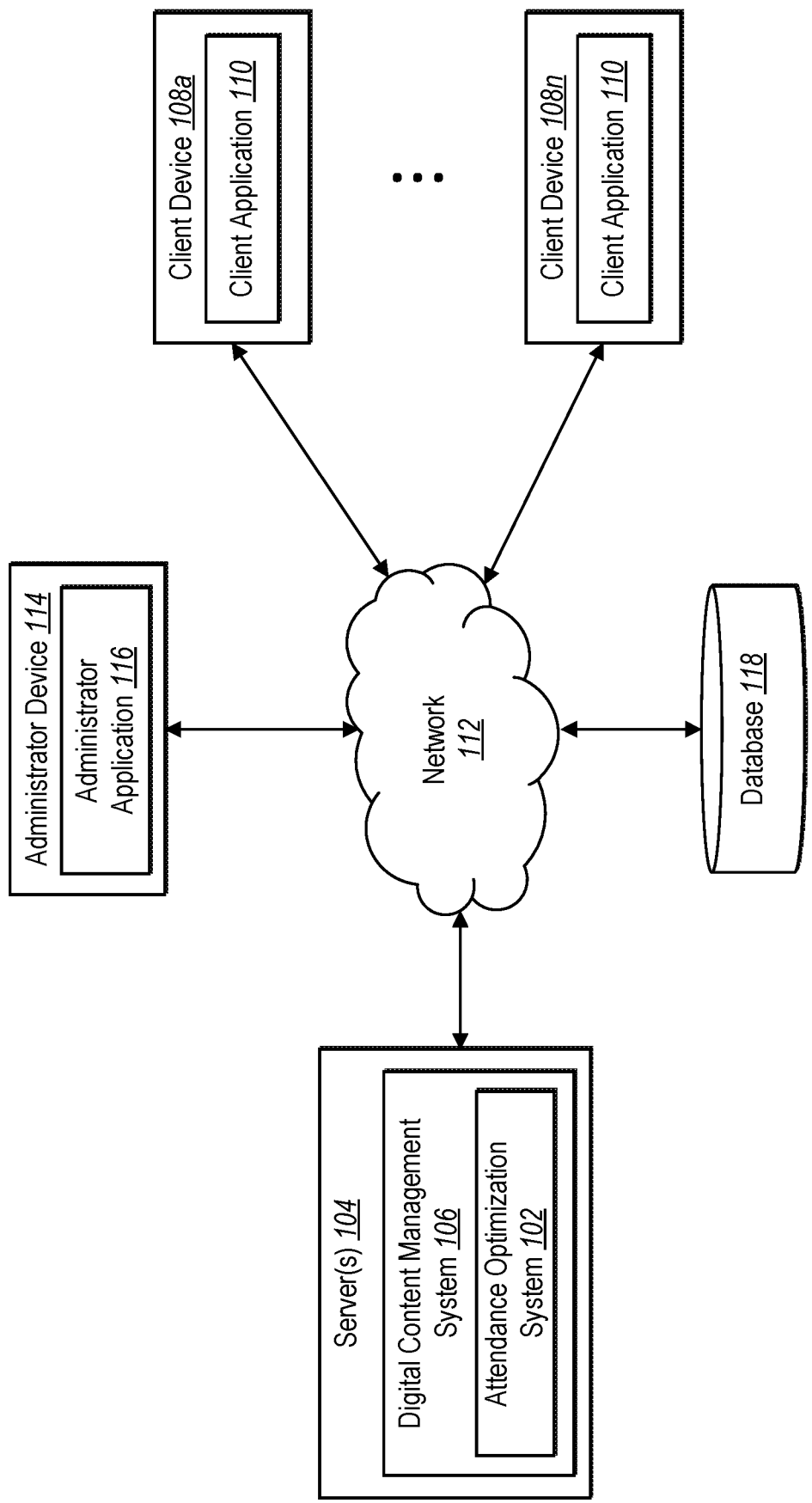
FIG. 1 illustrates an example environment for implementing an attendance optimization system in accordance with one or more embodiments.

One or more embodiments described herein provide benefits and solve one or more of the foregoing or other problems in the art with an attendance optimization system that generates a recommended target audience for an event based on determining a predicted attendance utilizing an approximate nearest neighbor algorithm and an attendance prediction model (e.g., a deep neural network). While this disclosure refers to an attendance optimization system, the described system can be applied, not only for improving attendance, but also (or alternatively) for improving registration or other event-related key performance indices (KPIs). In some embodiments, the attendance optimization system can sequence one or more machine learning operations such as finding a set of individuals within a database that are similar to invitees for the event. The attendance optimization system can further generate predictions of likelihoods or probabilities that invitees will attend (or register for) the event. Based on the probability predictions of invitees attending the event, the attendance optimization system can further rank individuals identified as similar to the invitees according to the respective probabilities of corresponding invitees. In some embodiments, the attendance optimization system generates a predicted attendance (or registration) for the event based on the probabilities associated with the invitees and the corresponding similar individuals. Based on the predicted attendance being below a target attendance, the attendance optimization system can further generate a recommended target audience to achieve the target attendance. Thus, the attendance optimization system can use deep learning to determine both how many additional individuals to invite to an event and which additional individuals to invite to meet the target attendance.

Based on analyzing a set of invitees that have been invited to attend an event (e.g., a roundtable, a video conference, a trade show), the attendance optimization system can identify similar individuals to also invite to the event. In some embodiments, the attendance optimization system identifies the similar individuals that, when invited to the event, will achieve or improve one or more KPIs. For instance, the attendance optimization system can generate a recommended target audience that includes the original set of invitees in addition to individuals within a threshold similarity of one or more of the invitees. Indeed, the attendance optimization system can add one or more of the similar individuals based on probabilities of the similar individuals attending the event.

As mentioned, the attendance optimization system can find individuals within a database that are similar to invitees for an event. Indeed, the attendance optimization system can analyze a database of user information to identify users or individuals that are within a threshold similarity in relation to a set of invitees for an event. In particular, the attendance optimization system can utilize an approximate nearest neighbor algorithm to compare features associated with invitees within a set of invitees for a particular event with features associated with individuals whose information is stored within the database. In some embodiments, the attendance optimization system receives an indication (e.g., from an administrator device) to prioritize a feature, whereupon the attendance optimization system weights the feature more heavily in applying the approximate nearest neighbor algorithm.

As also mentioned, the attendance optimization system can generate probabilities that the invitees within a set of invitees will attend an event. In some embodiments, the attendance optimization system utilizes or applies an attendance prediction model to generate, based on features associated with the invitees, probabilities that the invitees (or the similar individuals) will attend the event. For example, the attendance optimization system can train and utilize an attendance prediction model in the form of a deep neural network to generate attendance probabilities for the invitees and/or the similar individuals.

Based on the individual predicted attendance probabilities associated with the invitees, the attendance optimization system can further determine a predicted attendance for the event. In some embodiments, the attendance optimization system ranks the invitees and/or the individuals within the similarity threshold based on corresponding probabilities of attending the event. In these or other embodiments, the attendance optimization system combines the individual predicted probabilities that the invitees will attend in accordance with the ranking of the invitees to determine an overall predicted attendance for the event.

As mentioned above, the attendance optimization system can generate a recommended target audience based on the predicted attendance. In particular, the attendance optimization system can generate a recommended target audience to achieve a target attendance for the event. For example, if the predicted attendance is below a targeted attendance, the attendance optimization system can intelligently identify additional individuals to invite. To generate the recommended target audience, in some embodiments, the attendance optimization system selects one or more individuals that satisfy the similarity threshold and have a high likelihood of attending the event. The attendance optimization system can select the number of additional invitees based on the difference between the target attendance, the predicated attendance, and the probabilities of the additional invitees on attending the event. In this manner, the attendance optimization system can invite a number of additional invitees to help ensure that the target attendance is met without wasting resources.

The attendance optimization system provides several advantages over conventional digital communication distribution systems. For example, the attendance optimization system improves accuracy relative to conventional systems. More specifically, the attendance optimization system utilizes an approximate nearest neighbor algorithm and an attendance prediction model to accurately identify individuals that are similar to invitees who have a relatively high probability of attending an event. Indeed, whereas conventional systems utilize broad-based targeting to distribute electronic communications for an event, the attendance optimization system utilizes machine learning techniques to accurately identify individuals within a similarity threshold of invitees based on specific features. Thus, the attendance optimization system accurately distributes electronic communications to invite additional individuals who are likely to attend the event. Experimenters have shown that, due to its improved accuracy, the attendance optimization system improves success rates when compared to conventional systems.

As such, the attendance optimization system can reduce or minimize many of the undesired consequences of broad-based targeting. In particular, the attendance optimization system can reduce or minimize the number of invitations and disinterest associated with over contact from a marketer. Similarly, many marketing systems have constraints on the number/frequency of communications that can be sent to an individual, by reducing invitations the attendance optimization system can help prevent exhausting marketing constraints.

In addition, the attendance optimization system improves efficiency over conventional systems. For example, in contrast to conventional systems that waste computer resources by generating and distributing electronic communications to excessive numbers of client devices, the attendance optimization system efficiently identifies a minimum number of individuals to meet a target audience. By intelligently generating the recommended target audience using an approximate nearest neighbor algorithm and an attendance prediction model, the attendance optimization system utilizes less processing power and less processing time by generating and distributing fewer electronic communications than conventional systems, while still improving one or more KPIs (e.g., increasing total attendance). In some embodiments, the attendance optimization system is faster than conventional system in that the attendance optimization system provides almost instantaneous feedback as to whether or not a particular KPI will be met based on a set of invitees, which the attendance optimization system can then use provide proactive predictions of how to modify a set of invitees to accomplish the KPI.

As a further advantage, the attendance optimization system improves flexibility over conventional digital communication distribution systems. Particularly, as opposed to conventional systems that are mainly reactive in nature, the attendance optimization system can flexibly adapt to changing circumstances by proactively predicting attendance for an event. Indeed, based on utilizing the approximate nearest neighbor algorithm and the attendance prediction mode, the attendance optimization system predicts attendance for an event based on features of invitees as well as features of other individuals whose information is stored within a system database. In addition, the attendance optimization system is adaptable to generate different recommended target audiences based on different target attendance metrics and different features associated with invitees and other individuals for various types of events.

In addition to the foregoing, the attendance optimization system is active rather than reactive. Thus, the attendance optimization system helps ensure that a proper number of invites are sent as soon as possible to help ensure that the target attendance is met. Indeed, the attendance optimization system makes active deep learning predictions and acts based on the predications rather than reacting to responses to invites or registrations.

As illustrated by the foregoing discussion, the present disclosure utilizes a variety of terms to describe features and benefits of the attendance optimization system. Additional detail is hereafter provided regarding the meaning of these terms as used in this disclosure. In particular, the term "electronic communication" (or simply "communication") refers to electronic data provided to client device(s) of a user or a group of users. An electronic communication can include an electronic message of a variety of formats using a number of protocols such as email messages, text (e.g., SMS, MMS, RCS, or iMessage) messages, phone calls, mobile short messages, mobile application push notifications, web browser push notifications, or targeted digital content campaign banners. In addition, an electronic communication can include digital content in the form of digital audio, digital video, digital images, and/or digital text. Further, an electronic communication can include information pertaining to an event. Indeed, electronic communications can be distributed to invite users to the event.

As mentioned, the attendance optimization system can distribute electronic communications to a set of invitees. As used herein, the term "invitee" refers to an individual, a business, a group of individuals, or another entity that has been invited to an event. Some invitees can attend, register for, or otherwise participate in an event, while other invitees can refrain from attending, registering for, otherwise participating in the event. The term "event" refers to an occasion or proceeding for invitees to attend (either in person or virtually). An event can be a business event for moving invitees through an interaction funnel to accomplish or improve a particular KPI. Example events include, but are not necessarily limited to, trade shows, webinars, executive roundtables, in-person events, conventions, conference calls, and business socials. Relatedly, the term "attend" (or variants such as "attendance" or "attending") refers to participation in an event. Attendance can include participation such in-person attendance or virtual attendance (e.g., via a webcam), and attendance can also (or alternatively) include other forms of participation such as registration for an event. The term attendance can also (or alternatively) refer to a number of participants associated with an event.

As mentioned above, the attendance optimization system can determine a probability of attending an event for an invitee based on features associated with the invitee. Additionally, the term "feature" refers to an attribute or characteristic associated with an invitee or an individual. Example features include, but are not limited to, age range, gender, geographic location, job title, lead score, topic of interest, engagement, and industry. A feature can also (or alternatively) refer to a deep feature that is learned by a neural network such as an attendance prediction model, where the deep feature is not necessarily perceivable to human observation but is learned through the various nodes, layers, and weights associated with the neural network.

As mentioned, the attendance optimization system can identify individuals who are similar to invitees for an event. The term "individual" refers to a person or other entity associated with a client device. Indeed, an individual can include an invitee or a potential invitee. In some embodiments, an individual includes a person whose information is stored within a database associated with the attendance optimization system. In addition, the term "similar individual" refers to an individual that is within a threshold similarity of one or more invitees. Indeed, the attendance optimization system can determine a similarity or similarity score for an individual with respect to one or more invitees based on one or more features associated with the individual and/or the invitee.

To determine the similarity score, the attendance optimization system can utilize an approximate nearest neighbor algorithm. As used herein, the term "approximate nearest neighbor algorithm" refers to a machine learning model that identifies people that are similar by evaluating distances between the people in an n-dimensional vector space. An approximate nearest neighbor algorithm can include a k-nearest neighbors algorithm that identifies similar people as the people that have the shortest distance between them within the vector space—e.g., a similar individual is an individual closest to a particular invitee within the vector space. The attendance optimization system can determine a value for k based on various factors by implementing hyperparameter tuning. In addition, the attendance optimization system can utilize an approximate approach for the approximate nearest neighbor algorithm that is computationally less expensive than other approaches, and that still satisfies a threshold accuracy. In relation to the vector space of the approximate nearest neighbor algorithm, the dimensions in the vector space can refer to the features associated with the people (e.g., the individuals and/or the invitees) represented. Thus, the attendance optimization system can utilize an approximate nearest neighbor algorithm to identify individuals that are similar to (e.g., within a threshold similarity of) invitees based on comparing their respective feature vectors.

As mentioned, the attendance optimization system can generate a recommended target audience for an event. As used herein, the term "target" (used as an adjective or descriptor) refers to a metric desired or sought by a user (e.g., an administrator or manager of a digital content campaign) or system. For example, the attendance optimization system can receive input from an administrator device to indicate target metrics such as a target attendance for an event. In addition, the term "recommended target audience" refers to a group of individuals and invitees that the attendance optimization system recommends inviting to an event. Indeed, the attendance optimization system can generate the recommended target audience by adding individuals to a set of invitees for the event. In some embodiments, a recommended target audience refers to a number of invitees and individuals that the attendance optimization system determines will achieve a target attendance for an event.

As mentioned, the attendance optimization system can determine a probability that an invitee will attend an event by utilizing an attendance prediction model. As used herein, the term "attendance prediction model" refers to a machine learning model that generates predictions of likelihoods or probabilities of invitees and/or individuals attending an event. For example, an attendance prediction model can include a deep neural network that learns features (e.g., deep features) associated with invitees and/or individuals to determine probabilities that the invitees and/or individuals will attend an event. The attendance prediction model can be a classifier that includes various layers, nodes, and weights that the attention prediction model utilizes and/or modifies to learn features for generating predictions. For example, the attendance prediction model can include an input layer, several hidden layers, and an output layer which predicts the probabilities based on the weights and neurons of the other layers.

As also mentioned, the attendance optimization system can train the attendance prediction model to generate accurate attendance probabilities. The term "train" refers to utilizing information to tune or teach a model (e.g., by adjusting one or more weights of a neural network) such as the approximate nearest neighbor algorithm or the attendance prediction model. The term "training" (used as an adjective or descriptor, such as "training data" or "training features") refers to information or data utilized to tune or teach the model. In some embodiments, the attendance optimization system trains one or more models to generate accurate predictions based on training data.

Additional detail regarding the attendance optimization system will now be provided with reference to the figures. For example, FIG. 1 illustrates a schematic diagram of an example environment for implementing an attendance optimization system 102 in accordance with one or more embodiments. An overview of the attendance optimization system 102 is described in relation to FIG. 1. Thereafter, a more detailed description of the components and processes of the attendance optimization system 102 is provided in relation to the subsequent figures.

As shown in FIG. 1, the environment includes server(s) 104, client devices 108a-108n, an administrator device 114, and a network 112. Each of the components of the environment can communicate via the network 112, and the network 112 may be any suitable network over which computing devices can communicate. Example networks are discussed in more detail below in relation to FIG. 11.

As mentioned, the environment includes client devices 108a-108n. The client devices 108a-108n can be one of a variety of computing devices, including a smartphone, a tablet, a smart a television, a desktop computer, a laptop computer, a virtual reality device, an augmented reality device, or some other computing device as described in relation to FIG. 11. FIG. 1 illustrates multiple different client devices 108a-108n, where each of the client devices 108a-108n can receive user input from invitees and/or individuals in the form of user actions such as opens, clicks, etc., in relation to electronic communications for accepting or declining invitations to events as well as (or alternatively) attending events. In some embodiments, the client devices 108a-108n facilitate attendance of an event via webcams, microphones, speakers, or other peripherals. The client devices 108a-108n can also provide information pertaining to user input and/or attendance to the server(s) 104. Thus, the attendance optimization system 102 on the server(s) 104 can receive responses to electronic communications to determine attendance information for events, and the attendance optimization system 102 can further facilitate virtual events where invitees participate via the client devices 108a-108n.

As shown, the client devices 108a-108n include a client application 110. In particular, the client application 110 may be a web application, a native application installed on the client devices 108a-108n (e.g., a mobile application, a desktop application, etc.), or a cloud-based application where all or part of the functionality is performed by the server(s) 104. The client application 110 can present or display information to an invitee or individual, including an electronic communication within an email interface, text messaging interface, or some other messaging or communication interface. In some embodiments, the client application 110 presents event information including registration information and/or the event itself (e.g., for virtual events such as webinars). Users such as invitees or individuals can interact with the client application 110 to provide user input to, for example, open or click an event invitation and/or attend (e.g., view and/or listen to) the event itself.

As further shown, the environment includes the administrator device 114. In particular, the administrator device 114 can communicate with the server(s) 104 and/or the client device 108a-108n via the network 112. For example, the administrator device 114 can receive input from an administrator via the administrator application 116 to set campaign parameters such as a target attendance for an event and/or for distributing electronic communications to the client devices 108a-108n. For instance, the administrator device 114 can provide, to the attendance optimization system 102, target metrics such as a target attendance, a maximum or minimum number of distributed electronic communications, and/or exclusion dates/times for distributing electronic communications.

As shown, the administrator device 114 includes an administrator application 116. The administrator application 116 may be a web application, a native application installed on the administrator device 114 (e.g., a mobile application, a desktop application, etc.), or a cloud-based application where all or part of the functionality is performed by the server(s) 104. In addition, the administrator application 116 may include functionality to set target metrics for the analytics system 106 and/or the attendance optimization system 102 to determine a recommended target audience for an event. In some embodiments, the administrator application 116 can also enable the selection or input of other digital content campaign parameters (e.g., duration, dates, etc.) for distributing electronic communications pertaining to an event.

As illustrated in FIG. 1, the environment includes the server(s) 104. The server(s) 104 may generate, store, process, receive, and transmit electronic data, such as electronic communications, responses to electronic communications, and/or event information. For example, the server(s) 104 can transmit data to the client devices 108a-108n to provide electronic communications for display via the client application 110. The server(s) 104 may identify (e.g., monitor and/or receive) data from the client device 108a in the form of a click of an invitation to an event within an electronic communication. In addition, the server(s) 104 can receive data from the administrator device 114 in the form of a selection of a target attendance or other parameters. In some embodiments, the server(s) 104 comprises a content server. The server(s) 104 can also comprise an application server, a communication server, a web-hosting server, a social networking server, a digital content campaign server, or a digital communication management server.

As shown in FIG. 1, the server(s) 104 can also include the attendance optimization system 102 (e.g., implemented as part of an analytics system 106). The analytics system 106 can communicate with the client devices 108a-108n to generate, modify, and transmit digital communications, such as electronic communications. As also shown, the environment includes a database 118 that is in communication with the server(s) 104, the administrator device 114, and/or the client devices 108a-108n via the network 112. In particular, the database 118 can store information such as information pertaining to invitees and other individuals. Such information can include various features associated with respective invitees and individuals including job titles, industries, lead scores, topics of interest, and engagements. In some embodiments, the database 118 also includes training data such as training features associated with training invitees and/or training individuals for training a machine learning model such as an approximate nearest neighbor algorithm or an attendance prediction model. In some embodiments, though not illustrated in FIG. 1, the database 118 may be located on the server(s). In other embodiments, the database(s) are located externally from the server(s) 104 and are maintained by a third-party server connected via the network 112.

As mentioned, the database 118 can include data on features for users. In one or more embodiments, analytics system 106 tracks and stores the data. Alternatively, in some instances, a third-party network server may track the data. In one embodiment, the analytics system 106 can track the user data and then report the tracked user data to the database 118. In order to obtain the tracking data described above, the analytics system 106 may utilize data stored on the client computing devices 108a-108n (i.e., a browser cookie), embed computer code (i.e., tracking pixels), initialize a session variable, access a user profile, or engage in any other type of tracking technique.

Alternatively or additionally, the analytics system 106 may receive tracked user data directly from the client computing devices 108a-108n. For example, the analytics system 106 may install software code (tracking pixels of JavaScript) in web pages or native software applications provided to the client computing devices 108a-108n that causes the client computing devices 108a-108n to report user data directly to the analytics system 106.

For example, in one or more embodiments, the database 118 may utilize a distributed architecture, wherein the database 118 includes multiple storage devices that are not all connected to a common processing unit, but rather are controlled by a database management system. For instance, in one or more embodiments, the multiple storage devices of the database 118 are dispersed over a network. Stored data may be replicated, fragmented, or partitioned across the multiple storage devices.

Although FIG. 1 depicts the attendance optimization system 102 located on the server(s) 104, in some embodiments, the attendance optimization system 102 may be implemented by (e.g., located entirely or in part) one or more other components of the environment. For example, the attendance optimization system 102 may be implemented by the administrator device 114, the client devices 108a-108n, and/or a third-party device.

In some embodiments, though not illustrated in FIG. 1, the environment may have a different arrangement of components and/or may have a different number or set of components altogether. For example, the administrator device 114 and/or the client devices 108a-108n may communicate directly with the attendance optimization system 102, bypassing the network 112. Additionally, the attendance optimization system 102 can include one or more additional databases (e.g., a training database storing training data) housed on the server(s) 104 or elsewhere in the environment.

Figure 2:
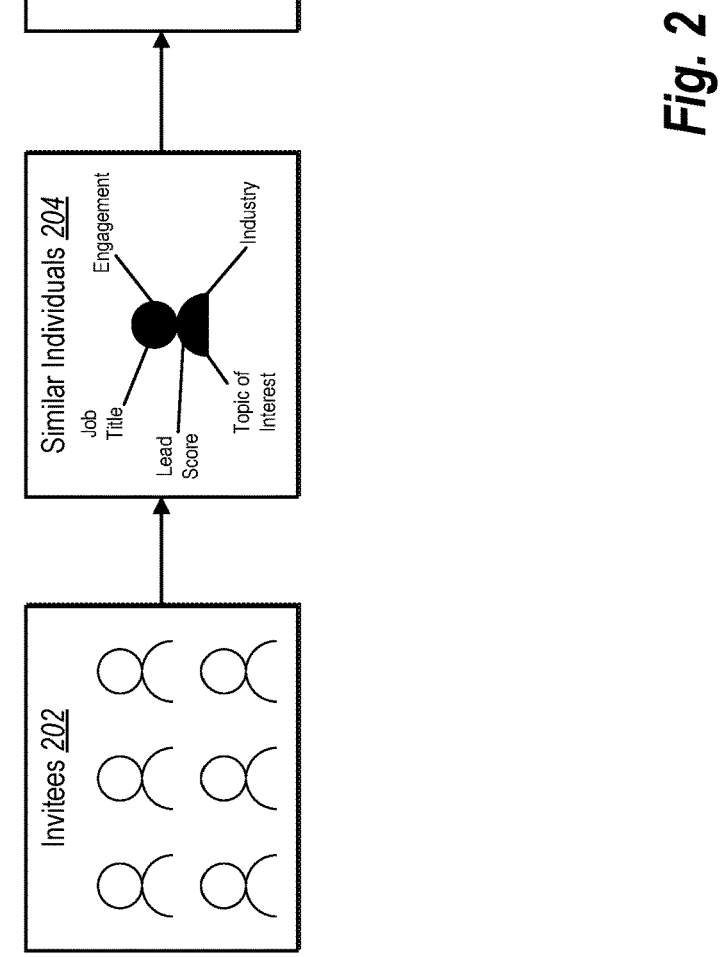
FIG. 2 illustrates an example overview of generating a recommended target audience in accordance with one or more embodiments.

As mentioned, the attendance optimization system 102 can generate a recommended target audience for an event. FIG. 2 illustrates an example flow of how the attendance optimization system 102 can generate a recommended target audience. The description of FIG. 2 provides an overview of the steps, methods, and techniques involved in generating a recommended target audience. Thereafter, the disclosure in relation to the subsequent figures provides a more detailed description of the individual steps and methods generally described in FIG. 2.

As shown by FIG. 2, the attendance optimization system 102 can receive or identify an initial group of invitees 202. For example, the attendance optimization system 102 can receive a list or other indication of invitees 202 selected by an administrator, marketer, or by another system or algorithm. More particularly, an administrator or marketer can identify a group of initial invitees that meet one or more requirements or characteristics. In one or more embodiments, the invitees 202 have recently been invited to the event.

As illustrated in FIG. 2, the attendance optimization system 102 analyzes the invitees 202 to identify similar individuals 204 from a database (e.g., the database 118) storing information pertaining to the individuals. In particular, the attendance optimization system 102 utilizes an approximate nearest neighbor algorithm to compare features associated with individuals to features associated with invitees. More specifically, the attendance optimization system 102 generates feature vectors and determines distances between the feature vectors within a vector space. In applying the approximate nearest neighbor algorithm, the dimensionality of the vector space corresponds to the number of features associated with the invitee and/or the individual. For example, the attendance optimization system 102 compares a first invitee with a number of individuals by generating and comparing the feature vector of the invitee with generated feature vectors associated with the respective individuals. In some embodiments, the attendance optimization system 102 identifies a similar individual as an individual that satisfies a similarity threshold with respect to the invitee. In these or other embodiments, the attendance optimization system 102 identifies the similar individual as an individual with the smallest distance from the feature vector of the invitee within the vector space. Additional detail regarding applying the approximate nearest neighbor algorithm to identify similar individuals is provided below with reference to FIG. 3.

As illustrated in FIG. 2, the attendance optimization system 102 determines attendance probabilities 206 for an event associated with the invitees and the similar individuals. More specifically, the attendance optimization system 102 utilizes an attendance prediction model to analyze features associated with the set of invitees 202 to generate probabilities of the invitees within the set attending an event based on the respective features. In some embodiments, the attendance optimization system 102 utilizes a first set of features in applying the approximate nearest neighbor algorithm, and the attendance optimization system utilizes a second set of features in applying the attendance prediction model. In some cases, the features associated with the approximate nearest neighbor algorithm are a subset of the features associated with the attendance prediction model. Indeed, in some embodiments, the features associated with the approximate nearest neighbor algorithm and the attendance prediction model are a result of the particular problem being solved—the determination of a likelihood of attending an event may depend on a large set of features, whereas the determination of similar individuals may consider a smaller set of features. In some embodiments, the attendance optimization system 102 generates attendance probabilities 206 in percentages (e.g., 90%, 15%, or 60%), while in other embodiments the attendance optimization system 102 normalizes the attendance probabilities 206 as fractions or portions of 1 (e.g., 0.9, 0.15, or 0.60).

In the same or other embodiments, the attendance optimization system 102 trains the attendance prediction model to generate accurate attendance probabilities 206 based on training features and corresponding ground truth attendance information. Additional information regarding applying the attendance prediction model to generate attendance probabilities is provided below with reference to FIG. 4. Additional information regarding training the attendance prediction model is provided thereafter with reference to FIG. 7.

In some embodiments, the attendance optimization system 102 ranks invitees 202 based on their probabilities of attending an event. For example, the attendance optimization system 102 determines a probability of attending an event for each invitee within the set of invitees 202, and the attendance optimization system 102 further generates a ranking of the set of invitees 202 in order (e.g., ascending or descending) of their attendance probabilities. In some embodiments, the attendance optimization system 102 ranks similar individuals 204 based on their respective probabilities of attending an event. For example, the attendance optimization system 102 generates a ranking of the similar individuals 204 in order (e.g., ascending or descending) of their respective attendance probabilities (e.g., as determined by applying the attendance prediction model or by associating probabilities of corresponding invitees within respective similarity thresholds). Additional detail regarding ranking invitees and/or individuals is provided below with reference to FIG. 5.

As further illustrated in FIG. 2, the attendance optimization system 102 generates a recommend target audience 208 based on the attendance probabilities 206. For example, the attendance optimization system 102 selects one or more similar individuals 204 to add to the set of invitees 202 to generate the recommended target audience 208. In some embodiments, the attendance optimization system 102 selects one or more of the similar individuals 204 based on the attendance probabilities associated with the invitees within the set of invitees 202 and/or associated with the similar individuals 204.

To elaborate, the attendance optimization system 102 adds one or more similar individuals 204 to the set of invitees 202 to generate the recommended target audience 208 based on the attendance probabilities associated with the similar individuals 204. For example, the attendance optimization system 102 selects individuals within a threshold similarity of invitees that have an attendance probability that satisfies an attendance probability threshold. In some embodiments, the attendance optimization system 102 selects individuals within a threshold similarity of invitees that are ranked, according to their respective attendance probabilities, within a top number (e.g., 5, 10, 50, 100) of invitees within the set of invitees 202.

In these or other embodiments, the attendance optimization system 102 determines a target attendance for an event (e.g., as received from the administrator device 114). In addition, the attendance optimization system 102 determines a predicted attendance for the event based on the attendance probabilities associated with the set of invitees 202. For example, the attendance optimization system 102 determines a total number of invitees from the set of invitees 202 that are predicted to attend the event. Based on comparing the predicted attendance with the target attendance (e.g., by determining a difference between them), the attendance optimization system 102 further determines a number of individuals from the similar individuals 204 that need to be invited to achieve the target attendance. For example, the attendance optimization system 102 determines that, based on the probabilities of similar individuals 204 attending the event, a particular number of similar individuals 204 to invite to the event to achieve the target attendance. Additional detail regarding generating the recommended target audience is provided below with reference to FIG. 6.

Based on generating the recommended target audience 208, in some embodiments, the attendance optimization system 102 distributes electronic communications to client devices (e.g., one or more of client devices 108a-108n) associated with the recommended target audience 208. For example, the attendance optimization system 102 distributes electronic communications such as digital invitations, webinar links, or other digital content to invite the recommended target audience to 208 to attend an event.

Although FIG. 2 illustrates the various methods and techniques occurring in a particular order, this is merely exemplary. Indeed, in some embodiments the attendance optimization system 102 can generate a recommended target audience by performing the various acts in a different order. For example, in some embodiments the attendance optimization system 102 utilizes the attendance prediction model to generate attendance probabilities for invitees before then identifying similar individuals via the approximate nearest neighbor algorithm.

Figure 3:
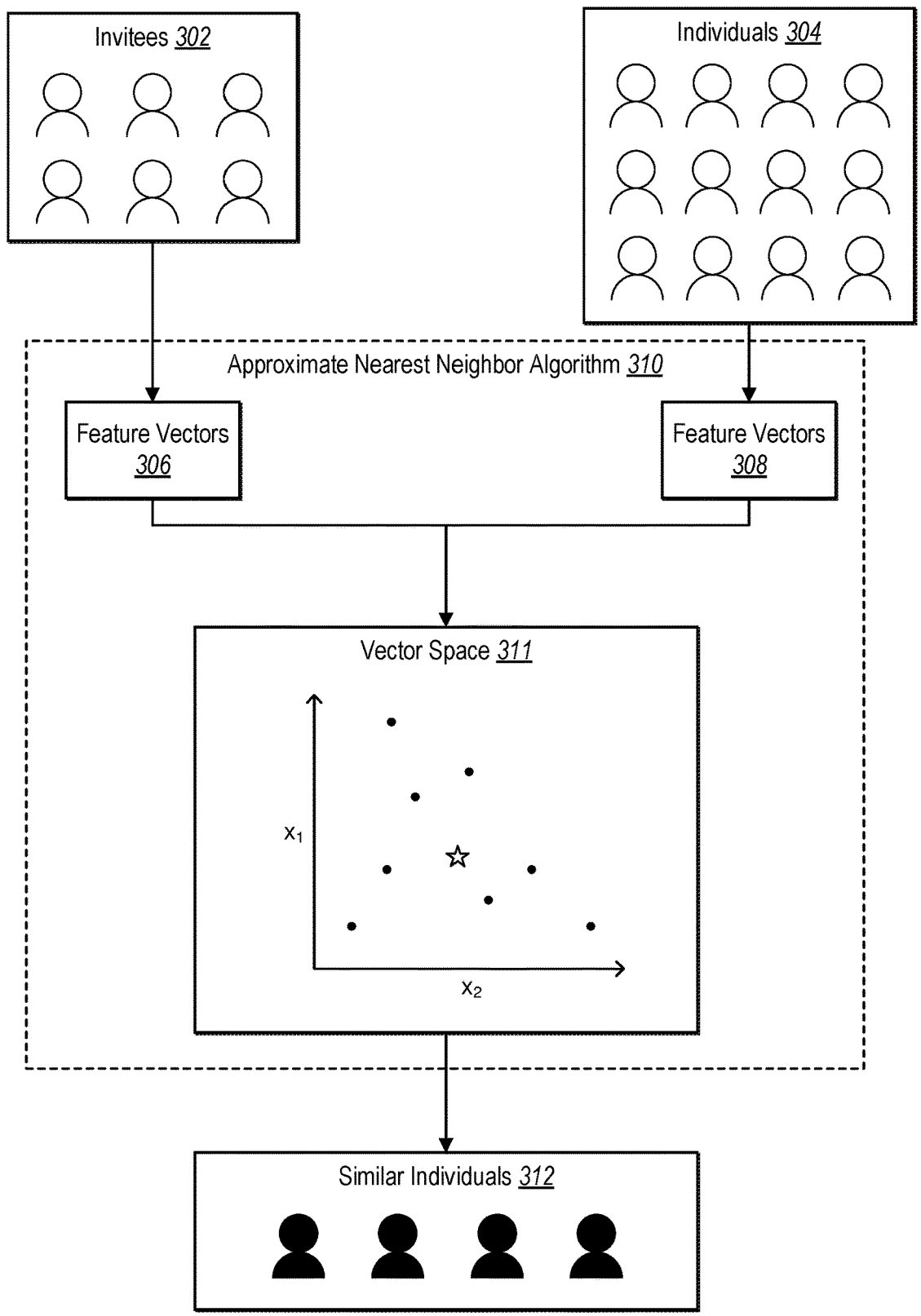
FIG. 3 illustrates an example flow of utilizing an approximate nearest neighbor algorithm to identify similar individuals in accordance with one or more embodiments.

As mentioned, the attendance optimization system 102 can determine or identify similar individuals based on analyzing features. Indeed, FIG. 3 illustrates an example flow depicting how the attendance optimization system 102 can analyze features associated with the invitees 302 (e.g., within the set of invitees 202) and features associated with the individuals 304 (e.g., stored within the database 118). As shown, the attendance optimization system 102 can utilize an approximate nearest neighbor algorithm 310 to analyze invitees 302 and individuals 304. In some embodiments, the attendance optimization system 102 iterates through individual invitees from the invitees 302 to use references for respectively determining similar individuals by way of the approximate nearest neighbor algorithm 310.

To elaborate, the attendance optimization system 102 generates feature vectors 306 associated with the invitees 302. In particular, the attendance optimization system 102 generates, for an invitee, a feature vector having particular features that describe the invitee. For example, the attendance optimization system 102 generates an n-dimensional feature vector, where n represents the number of features associated with the invitee. In a similar fashion, the attendance optimization system 102 generates feature vectors 308 for the individuals 304. In one or more embodiments, the features used as part of the similar individual detection process are human understandable features such as demographic information, economic information, employment information, past attendance information, location information, etc.

More particularly, the features can include actions, characteristics, or traits associated with users/individual. For example, the features can include actions taken by a user (e.g., clicked a link, hovered over a graphic, landed on a web page), demographics represented by a user (e.g., aged 18-30, male gendered, employed), and/or a location associated with a user (e.g., southwest USA, New York City, zip code 94020). While features are not necessarily binary in some embodiments, in one or more embodiments, every feature represented is binary. In other words, the attendance optimization system 102 can represent a user's association with any feature as a one (e.g., meaning the user is associated with that feature) or a zero (e.g., meaning the user is not associated with that feature). In such embodiments, the attendance optimization system 102 transforms originally non-binary features into binary features. For example, if a feature is age (which is not binary), attendance optimization system 102 sets a revised feature to an age related binary feature (e.g., aged 25-40, under 25, over 60).

Thus, to generate the feature vectors, the attendance optimization system 102 can generate an n-dimensional vector corresponding to n features. The attendance optimization system 102 can include a one or a zero in each entry in the feature vector based on whether or not the user/individual has or is associated with the given feature.

As illustrated in FIG. 3, the attendance optimization system 102 utilizes the approximate nearest neighbor algorithm 310 to analyze the individuals 304 and compare them to the invitees 302. For instance, the attendance optimization system 102 applies the approximate nearest neighbor algorithm 310 to compare the feature vectors 308 of the individuals 304 with one or more of the feature vectors 306 associated with the invitees 302. In applying the approximate nearest neighbor algorithm 310, the attendance optimization system 102 can weight the features within the feature vectors 306 and 308. In some embodiments, the attendance optimization system 102 weights the features equally, while in other embodiments the attendance optimization system 102 weights the features differently within the approximate nearest neighbor algorithm 310. For example, the attendance optimization system 102 can receive an indication of one or more features germane to the event (e.g., from the administrator or based on machine learning) and weight such more heavily than one or more other features.

To compare the feature vectors 308 associated with the individuals 304 with the feature vectors 306 associated with the invitees 302, the attendance optimization system 102 determines distances between the vectors within a vector space 311. As illustrated in FIG. 3, for example, the attendance optimization system 102 plots a feature vector (e.g., one of the feature vectors 306) for an invitee within the vector space 311 (e.g., as indicated by the star within the graph). In addition, the attendance optimization system 102 plots a plurality of feature vectors 308 (e.g., as indicated by the dots within the graph) for various individuals 304 to compare with the feature vector of the invitee. While FIG. 3 illustrates a two-dimensional vector space with features represented by the axes $x_1$ and $x_2$, this is merely exemplary for ease of illustration. Indeed, for feature vectors 306 and 308 with large numbers of dimensions, the approximate nearest neighbor algorithm 310 generates a vector space 311 of a corresponding dimensionality for comparing the feature vectors.

As mentioned, to identify or determine similar individuals (e.g., individuals with a similarity threshold) with respect to an invitee, the attendance optimization system 102 determines distances between the feature vectors (e.g., between the feature vector of the invitee and the feature vectors 308 of the individuals 304) within the vector space 311. For example, the attendance optimization system 102 determines distance between feature vectors utilizing the approximate nearest neighbor algorithm 310. In some embodiments, the attendance optimization system 102 selects an individual whose corresponding feature vector has the smallest or closest distance with respect to the feature vector of the invitee as a similar individual relative to the invitee.

In these or other embodiments, the attendance optimization system 102 selects or determines a value for k within the approximate nearest neighbor algorithm 310. For instance, the value of k represents a number of nearest neighbor matches that the attendance optimization system 102 is to identify or select. Thus, the attendance optimization system 102 determines a value for k by utilizing a hyperparameter tuning technique. For instance, the attendance optimization system 102 tunes the hyperparameters associated with the approximate nearest neighbor algorithm 310 by training the approximate nearest neighbor algorithm 310 based on training features, evaluating the aggregate accuracy of the approximate nearest neighbor algorithm 310, and modifying the hyperparameter (e.g., a parameter for controlling the learning process) to improve the accuracy. In some embodiments, however, the attendance optimization system 102 selects a set value (e.g., 5) for k.

In some embodiments, the attendance optimization system 102 receives an indication (e.g., from the administrator device 114) to prioritize a particular feature in identifying the similar individuals 312. Based on the indication to prioritize a particular feature, the attendance optimization system 102 weights the corresponding feature more heavily within the approximate nearest neighbor algorithm 310. Based on weighting one feature more heavily than another, approximate nearest neighbor algorithm 310 plots the feature vectors 306 and 308 differently within the vector space 311 to determine similar individuals with a greater consideration for the more heavily weighted feature(s). The attendance optimization system 102 thus utilizes the approximate nearest neighbor algorithm 310 to determine the similar individuals 312 (e.g., the similar individuals 204) by comparing feature vectors 306 of the invitees 302 with feature vectors 308 of the individuals 304.

The attendance optimization system 102 can optionally use another clustering algorithm other than an approximate nearest neighbor algorithm to identify similar individuals. For example, the attendance optimization system 102 can use a nearest neighbor algorithm rather than an approximate nearest neighbor algorithm. As nearest neighbor identification can be computationally expensive and time consuming when executed on large datasets (greater than a million people/leads), in one or more embodiments, the attendance optimization system 102 utilizes an approximate nearest neighbor algorithm as it is computationally less expensive while still providing an acceptable result. In one or more embodiments, the approximate nearest neighbor algorithm comprises locality-sensitive hashing, best bin first, or a balanced box-decomposition tree based search.

Figure 4:
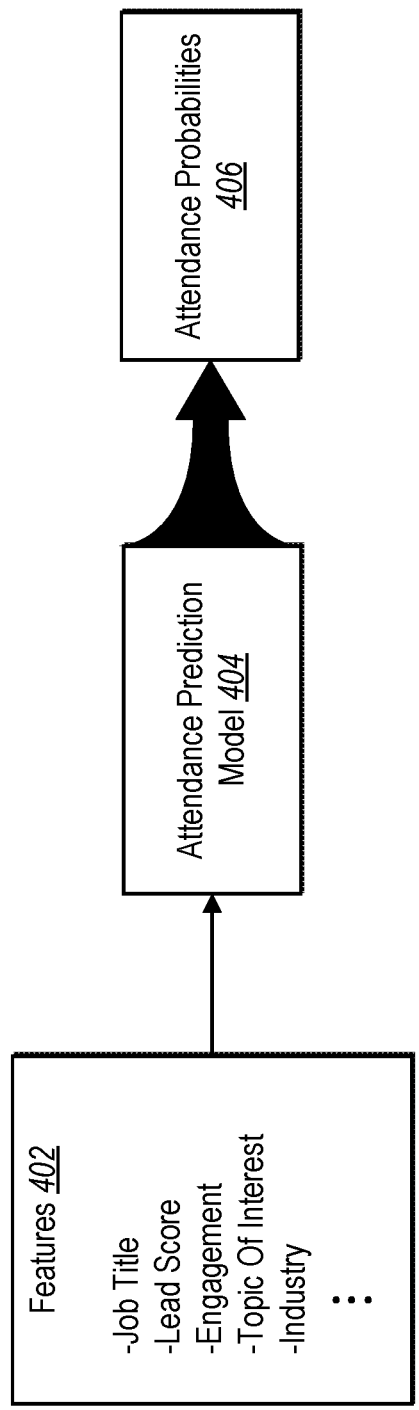
FIG. 4 illustrates determining attendance probabilities based on features of invitees in accordance with one or more embodiments.

As mentioned, the attendance optimization system 102 determines or generates probabilities of attending an event for invitees (e.g., the invitees 302 and/or the set of invitees 202) as well as for individuals (e.g., the similar individuals 312 and/or 204). FIG. 4 illustrates an example flow for a process by which the attendance optimization system 102 generates attendance probabilities. As shown, the attendance optimization system 102 utilizes a set of features 402 associated with a particular invitee to generate a corresponding probability of attending 406 (e.g., one of the attendance probabilities 206).

To elaborate, the attendance optimization system 102 utilizes an attendance prediction model 404 to generate, determine, or predict the probability of attending 406 based on an input of the features 402. More specifically, the attendance optimization system 102 utilizes the attendance prediction model 404 to, based on the input features 402 and as well as learned features associated with the attendance prediction model 404 (which may be hidden features), generate the probability of attending 406. For example, the attendance prediction model 404 has a particular architecture (e.g., a deep neural network) that includes various layers, neurons, and weights. Once trained, the attendance prediction model 404 applies learned weights to various features to generate the probability of attending based on the input features 402 for a given invitee (or similar individual).

More specifically, the attendance prediction model 404 can comprise a convolutional neural network (CNN). In some embodiments, the attendance prediction model 404 is a deep learning convolutional neural network. In alternative embodiments, the attendance prediction model 404 is a different type of neural network.

In particular, the attendance prediction neural network can include lower neural network layers (e.g., input layers) and higher neural network layers (e.g., hidden layers). In general, the lower neural network layers can collectively form an encoder and the higher neural network layers collectively form a decoder or classifier. In one or more embodiments, the lower neural network layers are convolutional layers that encode in input feature vector into encoded features. The encoded features can include hidden features or latent features not tracked or known before processing by the attendance prediction neural network.

The higher neural network layers can comprise fully-connected layers that classify the encoded features and output object attendance probabilities. In various embodiments, the higher neural network layers include a SoftMax classifier or sigmoid layer that provides a percentage that a user associated with a given set of features will attend an event. As mentioned above, the output layer can provide a number between 0 and 1 indicating a likelihood or probability that a user will attend an event.

Figure 5:
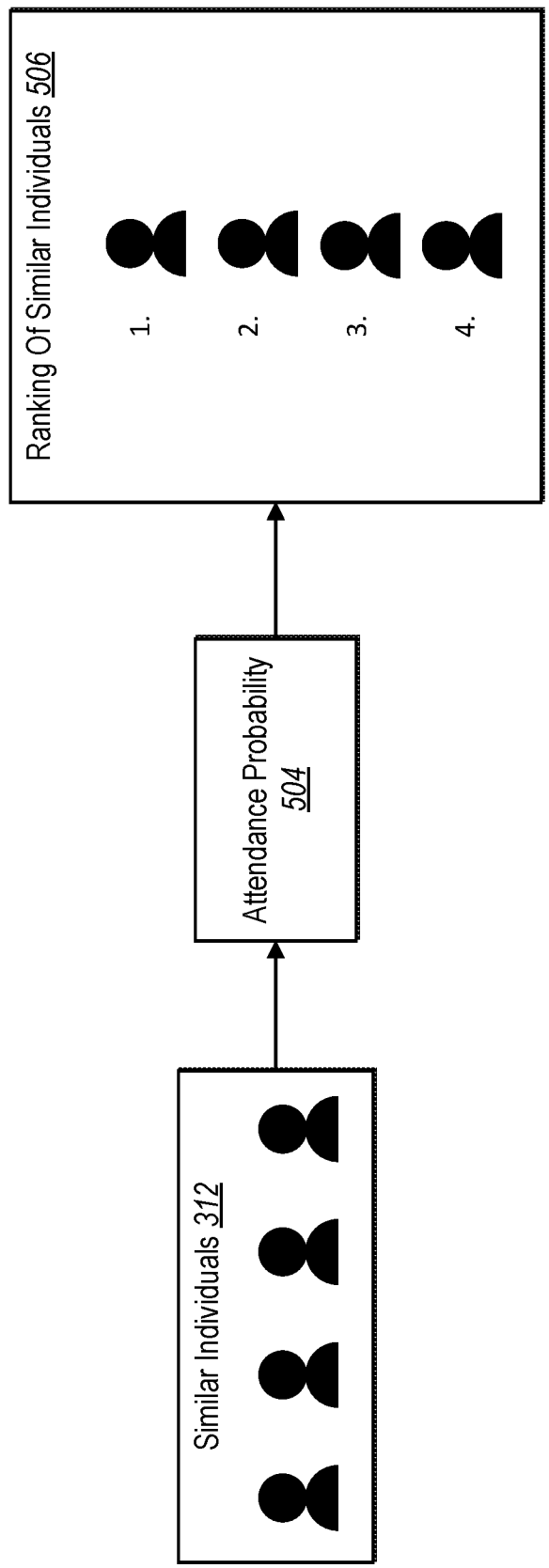
FIG. 5 illustrates generating a ranking of similar individuals based on attendance probabilities in accordance with one or more embodiments.

As mentioned above, the attendance optimization system 102 can generate a ranking of similar individuals (e.g., the similar individuals 312) based on the attendance probabilities 406. Indeed, FIG. 5 illustrates an example process by which the attendance optimization system 102 generates a ranking of similar individuals 506. As shown in FIG. 5, the attendance optimization system 102 analyzes the similar individuals 312 to determine attendance probabilities 504 associated with corresponding similar individuals 312 as described above relative to FIG. 4.

As illustrated in FIG. 5, the attendance optimization system 102 generates a ranking of similar individuals 506 based on the attendance probabilities 504. Particularly, the attendance optimization system 102 compares the attendance probabilities 504 for the various similar individuals 312 to rank the similar individuals 312 in a particular order (e.g., ascending or descending). In some embodiments, the attendance optimization system 102 ranks the similar individuals 312 in descending order, where the highest-ranked similar individual has the highest probability of attending an event.

Additionally, the attendance optimization system 102 can further filter the ranked list of similar individuals 312. In particular, the attendance optimization system 102 can filter out similar individuals with an attendance probability below a predetermined attendance probability threshold. Thus, the ranked list of similar individuals 506 can include individuals within a threshold similarity to an invitee and that have an attendance probability above a threshold.

Figure 6:
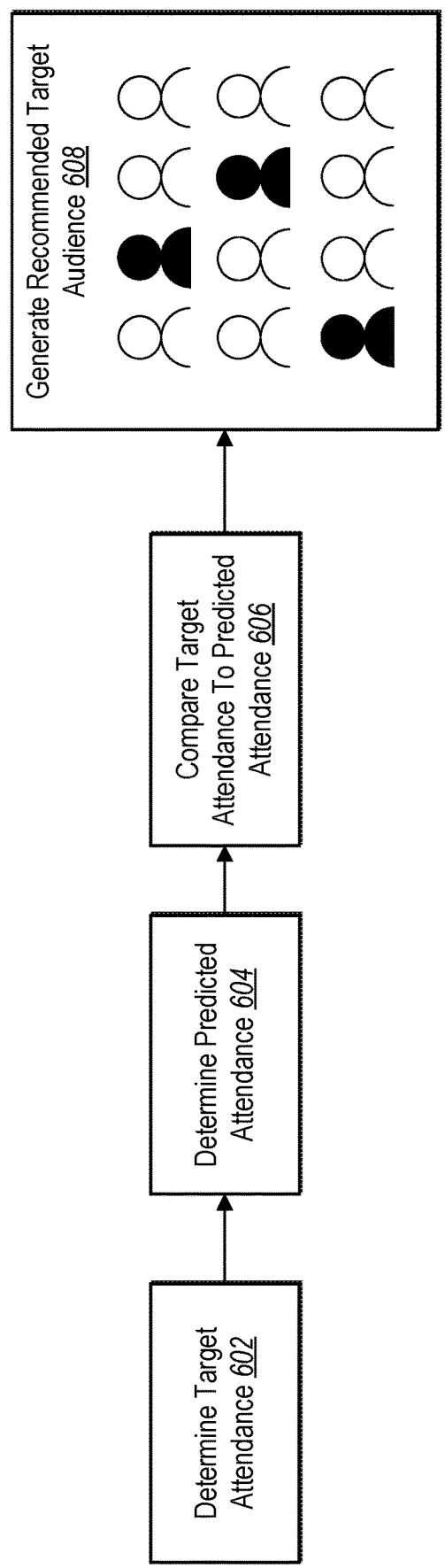
FIG. 6 illustrates generating a recommended target audience in accordance with one or more embodiments.

As mentioned, the attendance optimization system 102 can generate a recommended target audience based on identifying and/or ranking similar individuals (e.g., the similar individuals 312). FIG. 6 illustrates an example process by which the attendance optimization system 102 generates a recommended target audience based on a target attendance and a predicted attendance. Indeed, FIG. 6 illustrates a series or sequence of acts 602-608 that the attendance optimization system 102 performs to generate a recommended target audience for an event.

As shown, the attendance optimization system 102 performs an act 602 to determine a target audience for an event. In particular, the attendance optimization system 102 receives an indication to set a target audience (e.g., from the administrator device 114). For example, the attendance optimization system 102 receives an indication to set a target attendance of a particular number of attendees (e.g., 100, 250, 500, or 1000). In some embodiments, the attendance optimization system 102 determines the target attendance automatically, independent of input from the administrator device 114. For instance, the attendance optimization system 102 determines a type of event and analyzes previous target attendance metrics for similar events (e.g., events of the same type) to determine a target attendance for a new event. In these or other embodiments, the attendance optimization system 102 determines (either automatically or via administrator input) other KPIs such as a target registration, a target number of purchasers, a target number of clicks, or a target number of webpage visits.

As further shown in FIG. 6, the attendance optimization system 102 performs an act 604 to determine a predicted attendance for an event. In particular, the attendance optimization system 102 determines a predicted attendance for an event based on the attendance probabilities 406 for invitees. Indeed, the attendance optimization system 102 generates, based on determining respective probabilities of invitees attending an event, an overall prediction of the number of people (invitees and individuals) that will attend the event. For example, the attendance optimization system 102 determines the predicted attendance by combining or summing the probabilities, as given by:

$$\text{Predicted Attendance} = \Sigma(\text{Attendance Probability})^i$$

where i refers the set of invitees 202. As a non-limiting example, if there were three invitees with probabilities of attending an event of 0.70, 0.80, and 0.90, the predicted attendance would be 2.4 people. If any of the invitees have registered or otherwise indicated that they are attending, they can be given a predicted attendance of 1. Otherwise, such users can be excluded when determining the predicted attendance and the target attendance can be adjusted accordingly (i.e., reducing the target attendance).

As shown, the attendance optimization system 102 further performs an act 606 to compare the target attendance to the predicted attendance. In particular, the attendance optimization system 102 determines a difference between the target attendance and the predicted attendance. For instance, the attendance optimization system 102 determines a number of attendees that are still needed to satisfy the target attendance. As an example, the attendance optimization system 102 can determine a target attendance of 250, and the attendance optimization system 102 can further determine a predicted attendance of 200. Based on the target attendance of 250 and the predicted attendance of 200, the attendance optimization system 102 can determine that 50 attendees are still needed for the event.

As illustrated, the attendance optimization system 102 performs an act 608 to generate a recommended target audience to satisfy the target attendance. In particular, the attendance optimization system 102 determines a number of similar individuals (e.g., from the similar individuals 312) to invite to the event, based on their respective attendance probabilities, to make up for the difference between the target attendance and the predicted attendance.

In particular, the attendance optimization system 102 can access the ranking of similar individuals. The attendance optimization system 102 can then identify a number of the similar individuals, based on their predicted probability of attendance, to make up for the difference between the target attendance and the predicted attendance. For example, the attendance optimization system 102 can add up the predicted probabilities of the highest ranked similar individuals until the added predicted probabilities is equal to the difference between the target attendance and the predicted attendance. For example, if the difference between the target attendance and the predicted attendance is 5 and the predicted probabilities of the top ranked similar individuals are 1-0.90, 2-0.87, 3-0.85, 4-0.80, 5-0.76, 6-0.70, 7-0.68, and 8-0.65. The attendance optimization system 102 can identify the top seven similar individuals to add to form the recommended target audience as their probabilities sum to 5.56, which is at or above the difference between the target attendance and the predicted attendance of 5. Alternatively, the attendance optimization system 102 can identify a number of top ranked similar individuals with probabilities that sum the closest to the difference between the target attendance and the predicted attendance.

As illustrated in FIG. 6, the attendance optimization system 102 generates the recommended target audience to include selected similar individuals along with invitees (e.g., the set of invitees 202). For example, the attendance optimization system 102 modifies or augments the set of invitees 202 by adding similar individuals to generate an expanded list or an expanded set of invitees. As illustrated in FIG. 6, for instance, the light silhouettes represent invitees while the dark silhouettes represent similar individuals, included together within a recommended target audience. In some embodiments, however, the attendance optimization system 102 generates a recommended target audience of only similar individuals to invite to supplement a set of invitees that may have already been invited.

Although FIG. 6 illustrates the various acts 602-608 occurring a particular order, in some embodiments the attendance optimization system 102 can perform the acts 602-608 in a different order. For example, in some embodiments the attendance optimization system 102 determines the predicted attendance (act 604) before then determining the target audience (act 602).

Figure 7:
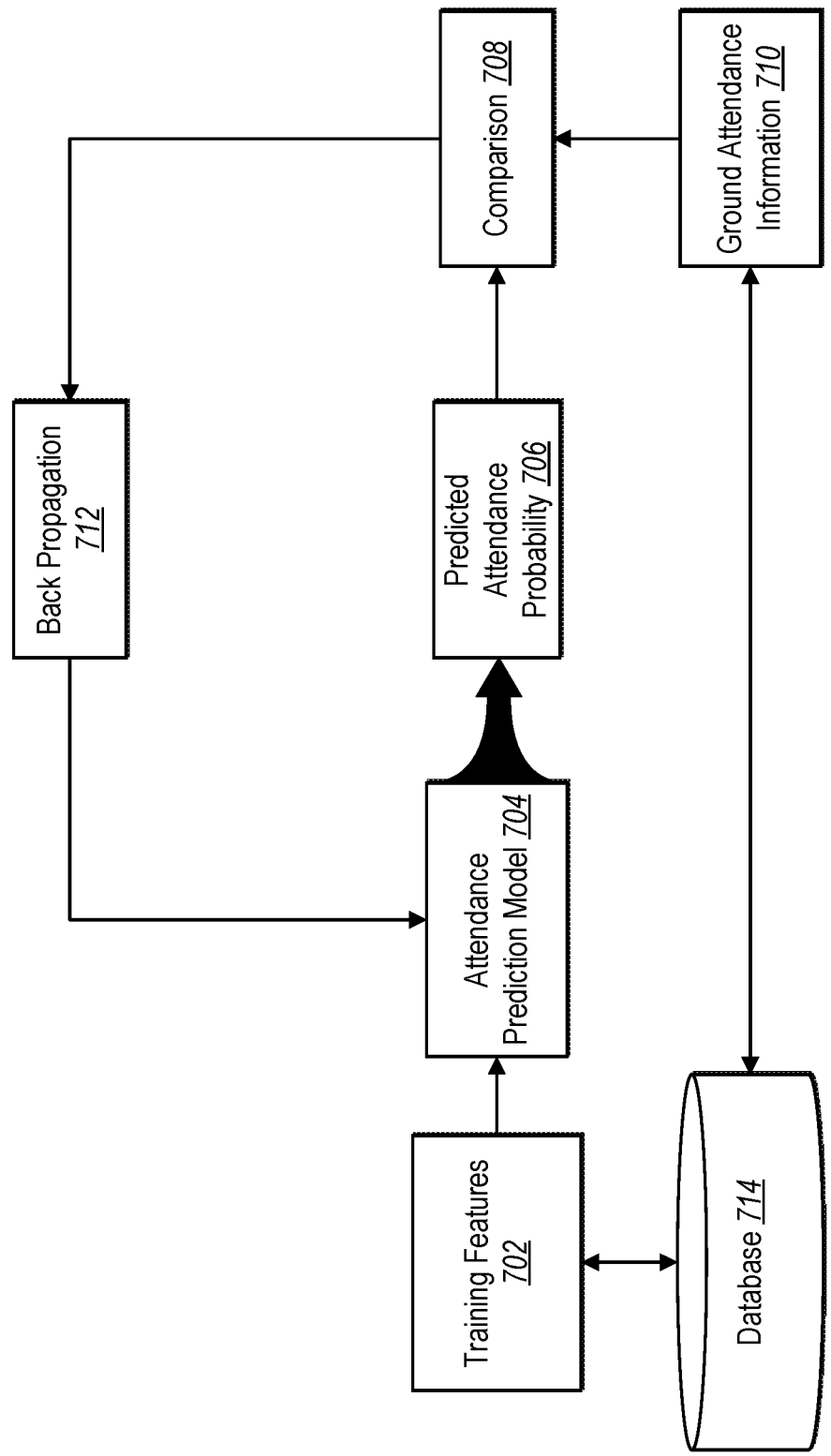
FIG. 7 illustrates training an attendance prediction model in accordance with one or more embodiments.

As mentioned above, the attendance optimization system 102 can train an attendance prediction model to generate accurate predictions of attendance probabilities. FIG. 7 illustrates an example process by which the attendance optimization system 102 trains an attendance prediction model 704 (e.g., the attendance prediction model 404) based on training data such as training features 702 and corresponding ground truth attendance information 710. As illustrated, the attendance optimization system 102 trains the attendance prediction model 704 to generate accurate predictions of classifications of attendance probabilities. In particular, the attendance optimization system 102 trains the attendance prediction model 704 based on training features associated with a particular organization/client. Indeed, in some embodiments the attendance optimization system 102 trains multiple attendance prediction models, one for each respective organization/client (and based on the features of individuals associated with the organization/client).

Particularly, the attendance optimization system 102 can access training features 702 within the database 714 (e.g., the database 118) to utilize as training data for the attendance prediction model 704. In addition, the attendance optimization system 102 can input the training features 702 into the attendance prediction model 704, whereupon the attendance prediction model 704 can generate a predicted attendance probability 706. Indeed, the attendance prediction model 704 analyzes the training features 702 utilizing the various internal layers, neurons, and weights associated with the attendance prediction model 704. Based on the analysis of the training features 702, the attendance prediction model 704 generates a predicted attendance probability 706 for the training features 702. For example, the attendance prediction model 704 predicts a percentage likelihood that an individual with the training features 702 will attend an event (e.g., an event of a particular type).

In addition, the attendance optimization system 102 accesses a ground truth attendance information 710 (e.g., a binary indication of whether the particular invitee or individual actually attended the event) from the database 714, where the ground truth attendance information 710 corresponds to the training features 702. More specifically, the attendance optimization system 102 identifies whether or not an individual with the training features 702 attended the event. Indeed, the attendance optimization system 102 stores, within the database 714, training data that includes different sets of training features and corresponding ground truth information associated with the sets of training features.

Based on the identifying the ground truth attendance information 710, the attendance optimization system 102 further implements a comparison 708. For example, the attendance optimization system 102 utilizes a determination of an error or a measure of loss to compare the ground truth attendance information 710 with the predicted attendance probability 706. Particularly, to compare the predicted attendance probability 706 with the ground truth attendance information 710, the attendance optimization system 102 utilizes a loss function such as a cross entropy loss function, a mean square error loss function, a Kullback-Liebler loss function, or another loss function. Thus, the attendance optimization system 102 determines an error or measure of loss associated with the attendance prediction model 704. By generating a loss determination, the attendance optimization system 102 determines an accuracy of the attendance prediction model 704, and in some embodiments, a degree to which the attendance prediction model 704 needs to be adjusted to improve the accuracy.

As further illustrated in FIG. 7, the attendance optimization system 102 further implements a back propagation 712. In particular, based on the determined error or measure of loss associated with the attendance prediction model 704, the attendance optimization system 102 performs one or more modifications to reduce or minimize the error or measure of loss. For example, the attendance optimization system 102 modifies weights associated with various neurons within layers of the attendance prediction model 704 to adjust internal neuron-specific and/or layer-specific outputs and thereby affect the final generated output associated with the attendance prediction model 704 using the Adam optimizer.

Upon modifying weights associated with the attendance prediction model 704 as part of the back propagation 712, the attendance optimization system 102 identifies another set of training features and corresponding ground truth information from the database 714. Based on the new training data, the attendance prediction model 704, in turn, generates another predicted attendance probability. In addition, the attendance optimization system 102 implements another comparison to determine whether (and to what extent) the attendance prediction model 704 needs to be adjusted to further increase its accuracy. Further, the attendance optimization system 102 implements another back propagation to modify weights of the attendance prediction model 704 to yet further reduce the error. By repeating the process illustrated in FIG. 7 in this way (e.g., for several or many iterations or epochs), the attendance optimization system 102 improves the accuracy of the attendance prediction model 704 until the attendance prediction model 704 generates predicted attendance probabilities that are within a threshold similarity of ground truth attendance information—or until the error associated with attendance prediction model 704 is below a particular error threshold.

Figure 8:
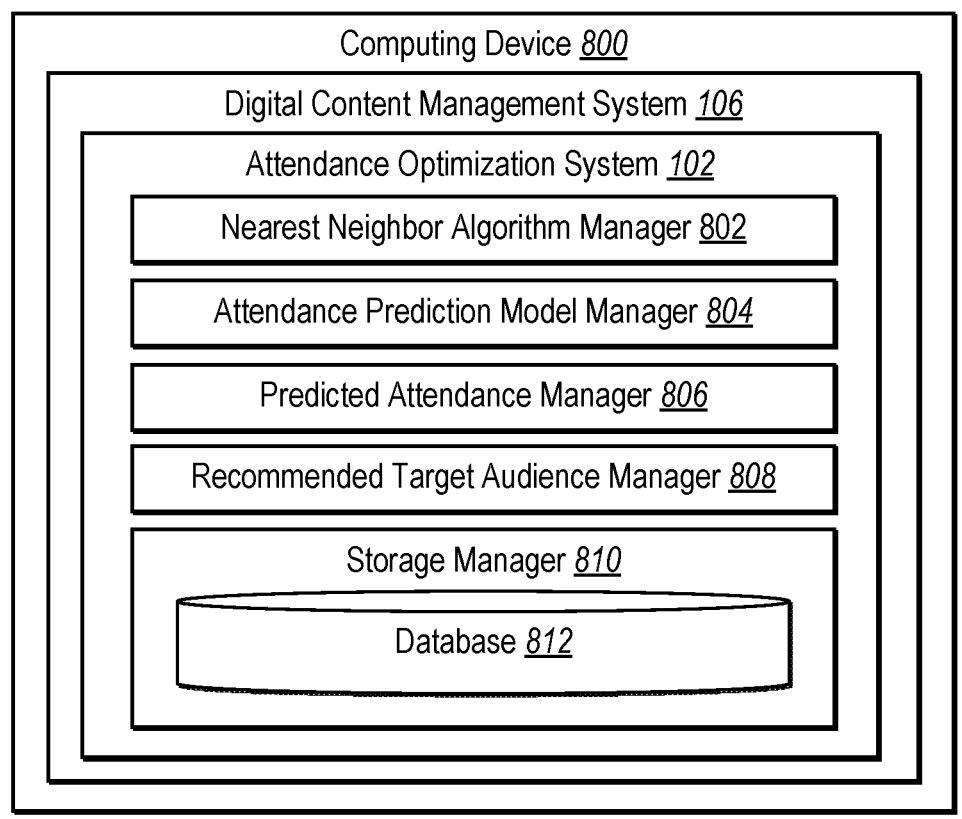
FIG. 8 illustrates a schematic diagram of an attendance optimization system in accordance with one or more embodiments.

Looking now to FIG. 8, additional detail will be provided regarding components and capabilities of the attendance optimization system 102. Specifically, FIG. 8 illustrates an example schematic diagram of the attendance optimization system 102 on an example computing device 800 (e.g., one or more of the client devices 108a-108n, the administrator device 114, and/or the server(s) 104). As shown in FIG. 8, the attendance optimization system 102 may include a nearest neighbor algorithm manager 802, an attendance prediction model manager 804, a predicted attendance manager 806, a recommended target audience manager 808, and a storage manager 810.

As just mentioned, the attendance optimization system 102 includes a nearest neighbor algorithm manager 802. In particular, the nearest neighbor algorithm manager 802 manages, utilizes, implements, or applies a nearest neighbor algorithm such as an approximate nearest neighbor algorithm (e.g., the approximate nearest neighbor algorithm 310) to determine, identify, discern, or detect individuals that satisfy a similarity threshold with respect to one or more invitees within a set of invitees. For example, the nearest neighbor algorithm manager 802 implements one or more of the methods and processes described above to compare features associated with invitees to features associated with other individuals (e.g., within a vector space) to identify individuals that satisfy a similarity threshold. Indeed, the nearest neighbor algorithm manager 802 communicates with the storage manager 810 to access stored feature information of invitees and other individuals within the database 812 for applying an approximate nearest neighbor algorithm, as described herein.

As shown, the attendance optimization system 102 also includes an attendance prediction model manager 804. In particular the attendance prediction model manager 804 manages, utilizes, implements, applies, and/or trains an attendance prediction model (e.g., the attendance prediction model 404 or 704) to generate, determine, predict, or identify attendance probabilities associated with invitees and/or similar individuals. For example, the attendance prediction model manager 804 determines, based on inputting features of an invitee into an attendance prediction model, a probability that the invitee will attend an event. Additionally, the attendance prediction model manager 804 trains an attendance prediction model based on training data stored and accesses within the database 812 (e.g., the database 714 or 118).

As mentioned, the attendance optimization system 102 further includes a predicted attendance manager 806. In particular, the predicted attendance manager 806 manages, determines, generates, or predicts a predicted attendance of an event. For example, the predicted attendance manager 806 communicates with the attendance prediction model manager 804 to determine, based on the individual attendance probabilities, an aggregate or collective predicted attendance for an event. As described, the predicted attendance manager 806 combines or sums the individual attendance probabilities of the invitees within a set of invitees to determine the predicted attendance.

As also mentioned, the attendance optimization system 102 includes a recommended target audience manager 808. In particular, the recommended target audience manager 808 communicates with the predicted attendance manager 806 to manage, generate, determine, select, identify, gather, suggest, or collect a recommended target audience based on the predicted attendance for an event. For example, the recommended target audience manager 808 receives an indication of (or otherwise identifies or determines) a target attendance for an event and, based on comparing the target attendance with the predicted attendance, generates a recommended target audience to satisfy the target attendance for the event.

In one or more embodiments, each of the components of the attendance optimization system 102 are in communication with one another using any suitable communication technologies. Additionally, the components of the attendance optimization system 102 can be in communication with one or more other devices including one or more client devices described above. It will be recognized that although the components of the attendance optimization system 102 are shown to be separate in FIG. 8, any of the subcomponents may be combined into fewer components, such as into a single component, or divided into more components as may serve a particular implementation. Furthermore, although the components of FIG. 8 are described in connection with the attendance optimization system 102, at least some of the components for performing operations in conjunction with the attendance optimization system 102 described herein may be implemented on other devices within the environment.

The components of the attendance optimization system 102 can include software, hardware, or both. For example, the components of the attendance optimization system 102 can include one or more instructions stored on a computer-readable storage medium and executable by processors of one or more computing devices (e.g., the computing device 800). When executed by the one or more processors, the computer-executable instructions of the attendance optimization system 102 can cause the computing device 800 to perform the methods described herein. Alternatively, the components of the attendance optimization system 102 can comprise hardware, such as a special purpose processing device to perform a certain function or group of functions. Additionally or alternatively, the components of the attendance optimization system 102 can include a combination of computer-executable instructions and hardware.

Furthermore, the components of the attendance optimization system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the attendance optimization system 102 may be implemented as part of a stand-alone application on a personal computing device or a mobile device. Alternatively or additionally, the components of the attendance optimization system 102 may be implemented in any application that allows creation and delivery of marketing content to users, including, but not limited to, applications in ADOBE MARKETING CLOUD, such as ADOBE CAMPAIGN, ADOBE TARGET, and ADOBE ANALYTICS. "ADOBE," "ADOBE CAMPAIGN," and "ADOBE ANALYTICS" are trademarks of Adobe Inc. in the United States and/or other countries.

FIGS. 1-8, the corresponding text, and the examples provide a number of different systems, methods, and non-transitory computer readable media for generating a recommended target audience for an event based on generating attendance predictions utilizing various machine learning models. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
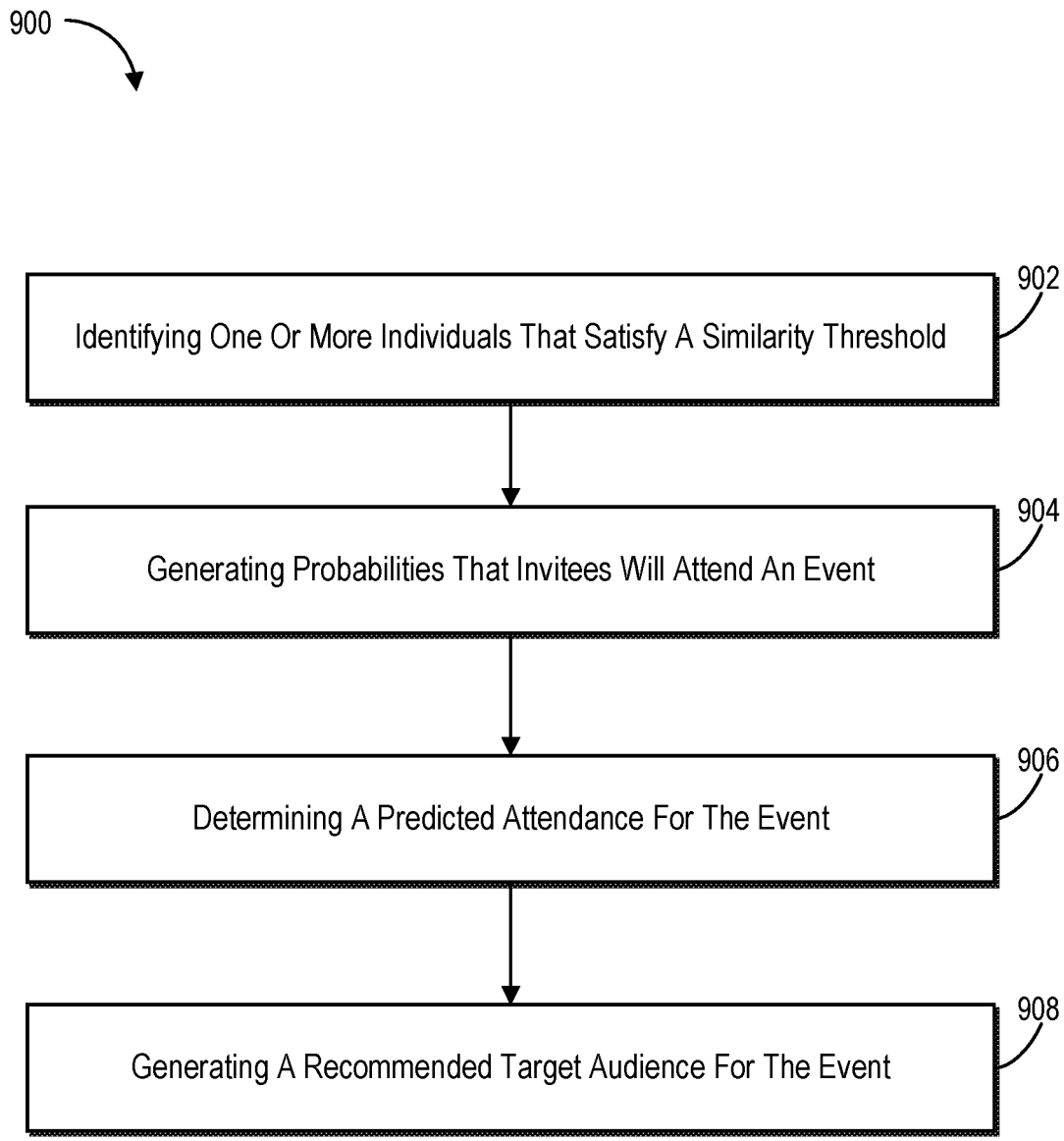
FIG. 9 illustrates a flowchart of a series of acts for generating a recommended target audience for an event in accordance with one or more embodiments.

While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for generating a recommended target audience for an event. The series of acts 900 includes an act 902 of identifying one or more individuals that satisfy a similarity threshold. In particular, the act 902 can involve utilizing a nearest neighbor algorithm (e.g., an approximate nearest neighbor algorithm) to identify, based on features associated with a plurality of individuals, one or more individuals that satisfy a similarity threshold with respect to a set of invitees for an event. In some embodiments, the series of acts 900 includes an act of receiving an indication to prioritize a feature in utilizing the nearest neighbor algorithm to identify the one or more individuals that satisfy the similarity threshold. In these or other embodiments, the series of acts 900 includes an act of, in response to the indication to prioritize the feature, weighting the feature more heavily within the nearest neighbor algorithm. The act 902 can involve utilizing an approximate nearest neighbor algorithm to identify the one or more individuals that satisfy the similarity threshold based on a first set of features.

The series of acts 900 can include an act of utilizing hyperparameter tuning to determine a number of nearest neighbor values for the approximate nearest neighbor algorithm based on analyzing the plurality of individuals. In addition, the series of acts 900 can include distributing electronic communications to client devices associated with the recommended target audience to attend the event.

As shown, the series of acts 900 includes an act 904 of generating probabilities that invitees will attend an event. In particular, the act 904 can involve generating, by applying an attendance prediction model to the set of invitees for the event, probabilities that the invitees within the set will attend the event. For example, act 904 can involve generating a feature vector for a given invitee. Act 904 can also involve processing the feature vector using an attendance prediction neural network to generate a probability that the given invitee will attend the event. In some embodiments, the attendance prediction model can include a deep neural network. In these or other embodiments, the series of acts 900 can include an act of training the attendance prediction model to generate the probabilities that the invitees will attend the event based on training features and ground truth attendance information. The act 904 can involve generating the probabilities that the invitees within the set will attend the event by applying the attendance prediction model based on a second set of features.

As further illustrated in FIG. 9, the series of acts 900 includes an act 906 of determining a predicted attendance for the event. In particular, the act 906 can involve determining a predicted attendance for the event based on the probabilities that the invitees within the set will attend the event. For example, the act 906 can involve combining by combining the probabilities that the invitees within the set will attend the event. In other words, act 906 can involve determining a predicted attendance for the event based on the probabilities that the invitees within the set will attend the event by summing the probabilities that the invitees within the set will attend the event.

In addition (or alternatively), the series of acts 900 includes an act 908 of generating a recommended target audience for the event. In particular, the act 908 can involve generating a recommended target audience to achieve a target attendance for the event based on the predicted attendance for the event. In some embodiments, the act 908 includes generating, based on the one or more individuals that satisfy the similarity threshold, a recommended target audience for the event to achieve based on the predicted attendance. In some embodiments, the series of acts 900 includes an act of receiving an input from an administrator device to set the target attendance.

The acts can further involve an act of ranking the one or more individuals that satisfy the similarity threshold. For example, the acts 900 can involve generating, by applying the attendance prediction model to the one or more individuals that satisfy the similarity threshold, attendance probabilities that the one or more individuals will attend the event. In particular, the acts 900 can involve generating a feature vector for a given similar individual. The acts 900 can also involve processing the feature vector using an attendance prediction neural network to generate an attendance probability that the given similar individual will attend the event. The acts 900 can then involve ranking the one or more individuals that satisfy the similarity threshold based on the attendance probabilities. In these embodiments, act 908 can involve generating the recommended target audience by selecting an individual from the one or more individuals that satisfy the similarity threshold based on the ranking.

Additionally, the act 908 can involve determining a difference between the predicted attendance for the event and the target attendance. Act 908 can also involve generating the recommended target audience by selecting, from the ranking, a number of similar individuals with associated attendance probabilities that sum to at least the difference between the predicted attendance for the event and the target attendance.

Figure 10:
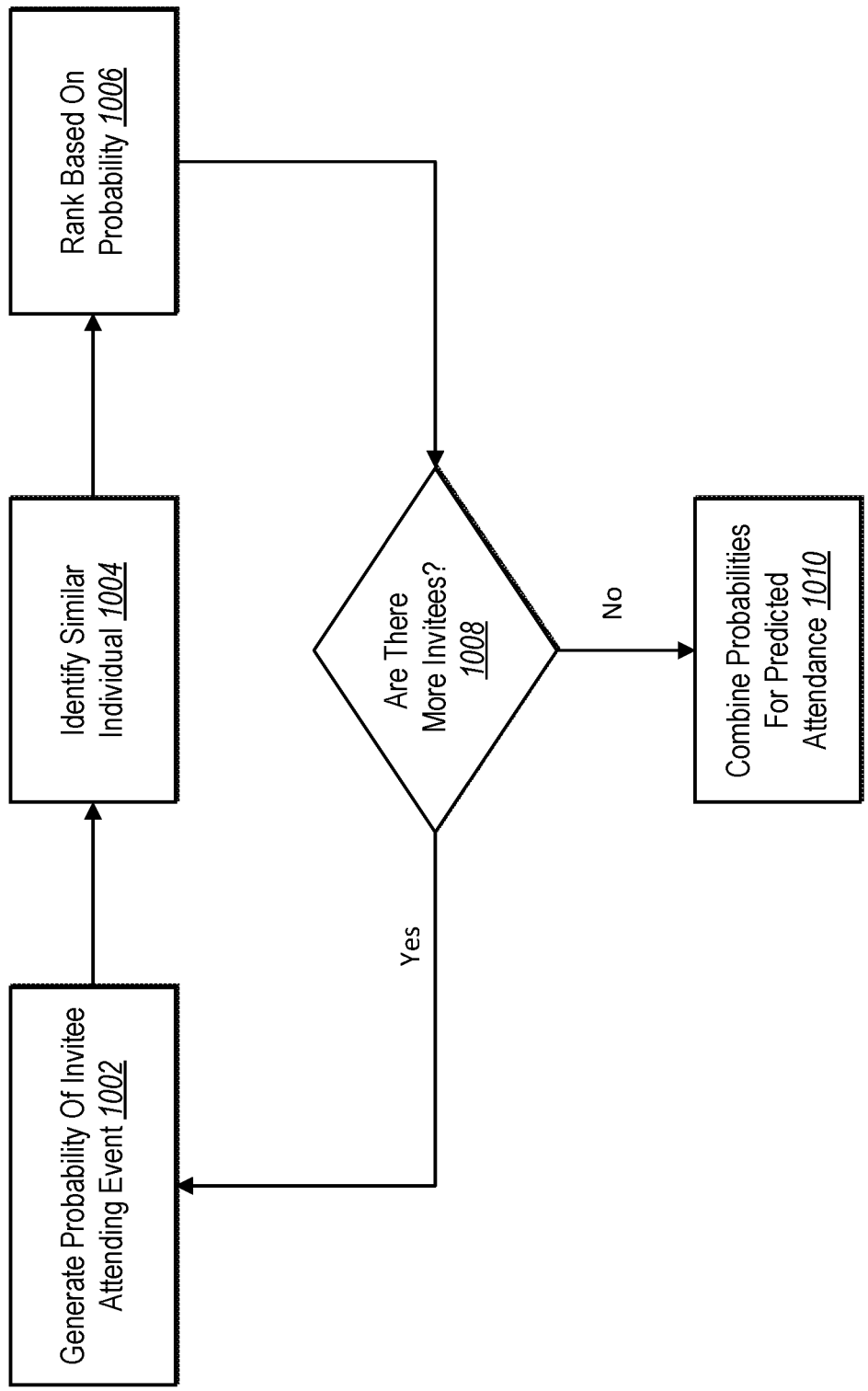
FIG. 10 illustrates an example series of acts in a step for determining a predicted attendance for the event by utilizing an attendance prediction model in accordance with one or more embodiments.

FIG. 10 illustrates an example process for performing a step for determining a predicted attendance for the event by utilizing an attendance prediction model, and the corresponding structure can be found hereafter and/or throughout this disclosure, including the acts 1002-1010 of FIG. 10.

As shown in FIG. 10, the attendance optimization system 102 perform an act 1002 to generate a probability of an invitee attending an event. In particular, the attendance optimization system 102 can utilize an attendance prediction model (e.g., the attendance prediction model 404 or 704) to generate a probability of a given invitee attending an event. For example, the attendance optimization system 102 utilizes the attendance prediction model to generate a prediction of a probability of attending the event based on features associated with the invitee, as described above.

In addition, the attendance optimization system 102 can perform an act 1004 to identify a similar individual. In particular, the attendance optimization system 102 can identify an individual that satisfies a similarity threshold with respect to the invitee. For example, the attendance optimization system 102 utilizes an approximate nearest neighbor algorithm (e.g., the approximate nearest neighbor algorithm 310) to compare feature vectors of the invitee with feature vectors of individuals. Thus, as described above, the attendance optimization system 102 identifies one or more similar individuals based on distances between feature vectors in vector space.

As shown, the attendance optimization system 102 further performs an act 1006 to rank the similar individuals based on respective probabilities of attending the event. In particular, the attendance optimization system 102 generates probabilities of attending the event for the similar individuals using the attendance prediction model. In some embodiments, the attendance optimization system 102 ranks the similar individuals in ascending or descending order.

In addition, the attendance optimization system 102 performs an act 1008 to determine whether there are more invitees within the set of invitees. Based on determining that there are more invitees, the attendance optimization system 102 can repeat the acts 1002-1006 to generate a probability for another invitee, identify similar individuals with respect to the invitee, and rank (by adding to an overall ranking of similar individuals with respect to all of the invitees) the similar individuals. On the other hand, in response to determining that there are no more invitees within the set of invitees, the attendance optimization system 102 performs an act 1010 to combine the attendance probabilities of the invitees to determine an overall predicted attendance for an event. As described above, the attendance optimization system 102 sums the probabilities to determine a predicted attendance (e.g., 0.8+0.2+0.8+0.4+0.6=2.8 predicted attendees).

Although FIG. 10 illustrates the acts 1002-1008 occurring in a particular order, in some embodiments the attendance optimization system 102 can perform the acts 1002-1008 in a different order. For example, the attendance optimization system 102 can perform the act 1004 before the act 1002. In these or other embodiments, the attendance optimization system 102 need not necessarily perform the acts 1002-1006 iteratively. For example, the attendance optimization system 102 identifies similar individuals for all invitees before then generating probabilities of invitees attending an event for all of the invitees. In the same or other embodiments, the attendance optimization system 102 need not perform the act 1006 to determine the predicted attendance. Indeed, the attendance optimization system 102 can combine the individual probabilities for the invitees and/or the similar individuals to generate an overall predicted attendance for an event. In any event, based on the description herein, the attendance optimization system 102 determines a predicted attendance for an event based on the similar individuals and the probabilities of invitees attending the event.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
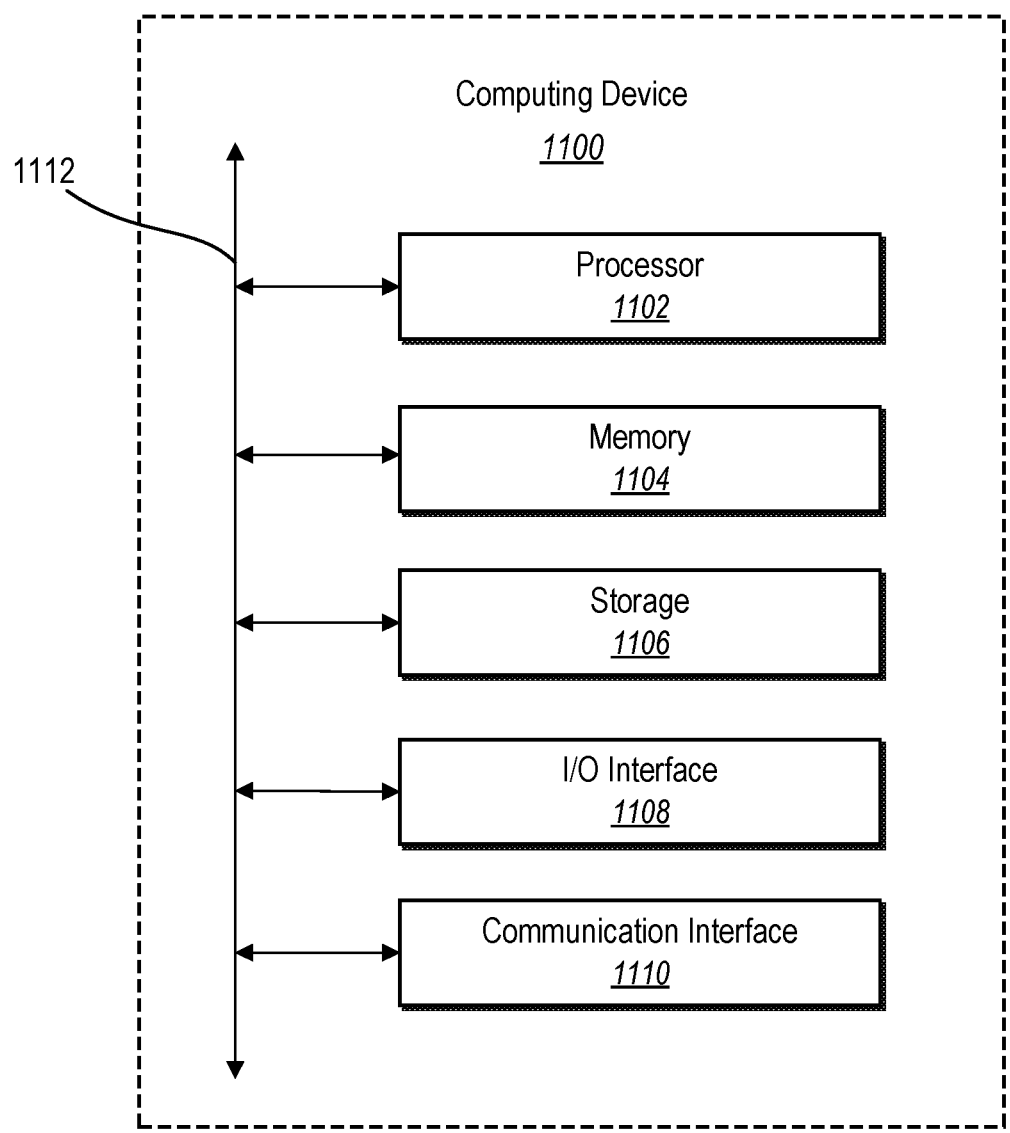
FIG. 11 illustrates a block diagram of an example computing device in accordance with one or more embodiments.

FIG. 11 illustrates, in block diagram form, an example computing device 1100 (e.g., the computing device 1000, the client devices 108a-108n, the administrator device 114, and/or the server(s) 104) that may be configured to perform one or more of the processes described above. One will appreciate that the attendance optimization system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating a virtual event at a web-hosting server, the virtual event comprising digital video captured from webcams and displayable at a plurality of client devices;

determining, utilizing a nearest neighbor algorithm to compare features of invitees for the virtual event and features of potential invitees for the virtual event, distances within a vector space between invitee vectors representing the features of the invitees and potential invitee vectors representing the features of the potential invitees, wherein the nearest neighbor algorithm comprises a hyperparameter tuned to select a number of nearest neighbor matches by evaluating aggregate accuracy of the nearest neighbor algorithm;

determining, utilizing an attendance prediction neural network to process from the features of the invitees for the virtual event, probabilities of the invitees attending the virtual event, wherein the attendance prediction neural network comprises network weights trained by comparing predicted attendance probabilities from training features with ground truth attendance information for training invitees corresponding to the training features;

ranking, utilizing an attendance optimization system, the potential invitees according to the probabilities of the invitees attending the virtual event and based on the distances within the vector space between the invitee vectors and the potential invitee vectors;

selecting, utilizing the attendance optimization system based on ranking the potential invitees, one or more potential invitees whose potential invitee vectors within the vector space are within a threshold distance of at least one of the invitee vectors to achieve a target attendance for the virtual event;

determining, from the plurality of client devices, a set of client devices corresponding to the invitees and the one or more potential invitees; and providing the digital video for the virtual event for display at the set of client devices.

2. The computer-implemented method of claim 1, further comprising:

receiving an indication to prioritize a feature in utilizing the nearest neighbor algorithm to identify the one or more potential invitees whose potential invitee vectors are within the threshold distance of at least one of the invitee vectors; and weighting the feature more heavily within the nearest neighbor algorithm in response to the indication to prioritize the feature.

3. The computer-implemented method of claim 2, wherein utilizing the nearest neighbor algorithm comprises utilizing an approximate nearest neighbor algorithm.

4. The computer-implemented method of claim 1, further comprising determining the number of nearest neighbor matches for the nearest neighbor algorithm by utilizing the hyperparameter tuned improve accuracy of the nearest neighbor algorithm.

5. The computer-implemented method of claim 1, further comprising distributing electronic communications to invite the set of client devices to attend the virtual event.

6. The computer-implemented method of claim 1, wherein attendance prediction neural network comprises a deep neural network.

7. A non-transitory computer readable medium storing executable instructions that, when executed by a processing device, cause to the processing device to perform operations comprising:

generating a virtual event at a web-hosting server, the virtual event comprising digital video captured from webcams and displayable at a plurality of client devices;

determining, utilizing a nearest neighbor algorithm to compare features of invitees for the virtual event and features of potential invitees for the virtual event, distances within a vector space between invitee vectors representing the features of the invitees and potential invitee vectors representing the features of the potential invitees, wherein the nearest neighbor algorithm comprises a hyperparameter tuned to select a number of nearest neighbor matches by evaluating aggregate accuracy of the nearest neighbor algorithm;

determining, utilizing an attendance prediction neural network to process from the features of the invitees for the virtual event, probabilities of the invitees attending the virtual event, wherein the attendance prediction neural network comprises network weights trained by comparing predicted attendance probabilities from training features with ground truth attendance information for training invitees corresponding to the training features;

ranking, utilizing an attendance optimization system, the potential invitees according to the probabilities of the invitees attending the virtual event and based on the distances within the vector space between the invitee vectors and the potential invitee vectors;

selecting, utilizing the attendance optimization system based on ranking the potential invitees, one or more potential invitees whose potential invitee vectors within the vector space are within a threshold distance of at least one of the invitee vectors to achieve a target attendance for the virtual event;

determining, from the plurality of client devices, a set of client devices corresponding to the invitees and the one or more potential invitees; and providing the digital video for the virtual event for display at the set of client devices.

8. The non-transitory computer readable medium of claim 7, wherein the operations further comprise:

receiving an indication to prioritize a feature in utilizing the nearest neighbor algorithm to determine the distances between invitee vectors and potential invitee vectors within the vector space; and in response to the indication to prioritize the feature, weighting the feature more heavily within the nearest neighbor algorithm.

9. The non-transitory computer readable medium of claim 7, wherein the operations further comprise:

determining a predicted attendance for the virtual event from attendance probabilities for the invitees and the attendance probabilities for the one or more potential invitees; and determining a difference between the target attendance for the virtual event and the predicted attendance for the virtual event.

10. The non-transitory computer readable medium of claim 9, wherein determining the set of client devices to provide the digital video for the virtual event comprises selecting a client device of a potential invitee from the one or more potential invitees based on ranking the potential invitees.

11. The non-transitory computer readable medium of claim 9, wherein the operations further comprise determining the predicted attendance for the virtual event by combining the attendance probabilities of the potential invitees with attendance probabilities the invitees.

12. The non-transitory computer readable medium of claim 7, wherein the operations further comprise training the attendance prediction neural network to generate the predicted attendance probabilities by comparing the predicted attendance probabilities with ground truth attendance information.

13. The non-transitory computer readable medium of claim 12, wherein the attendance prediction neural network comprises a deep neural network.

14. A system comprising:
one or more memory devices; and
one or more processors coupled to the one or more memory devices, the one or more processors configured to cause the system to:
generate a virtual event at a web-hosting server, the virtual event comprising digital video captured from webcams and displayable at a plurality of client devices;
determine, utilizing an approximate nearest neighbor algorithm to compare features of invitees for the virtual event and features of potential invitees for the virtual event, distances within a vector space between invitee vectors representing the features of the invitees and potential invitee vectors representing the features of the potential invitees, wherein the approximate nearest neighbor algorithm comprises a hyperparameter tuned to select a number of nearest neighbor matches by evaluating aggregate accuracy of the approximate nearest neighbor algorithm;
determine, utilizing an attendance prediction neural network to process the features of the invitees for the virtual event, probabilities of the invitees attending the virtual event, wherein the attendance prediction neural network comprises network weights trained by comparing predicted attendance probabilities from training features with ground truth attendance information for training invitees corresponding to the training features;
rank, utilizing an attendance optimization system, the potential invitees according to the probabilities of the invitees attending the virtual event and based on the distances within the vector space between the invitee vectors and the potential invitee vectors;
select, utilizing the attendance optimization system based on ranking the potential invitees, one or more potential invitees whose potential invitee vectors within the vector space are within a threshold distance of at least one of the invitee vectors to achieve a target attendance for the virtual event;
determine, from the plurality of client devices, a set of client devices corresponding to the invitees and the one or more potential invitees; and
provide the digital video for the virtual event for display at the set of client devices.

15. The system of claim 14, wherein the one or more processors are further configured to cause the system to:
determine a predicted attendance for the virtual event from attendance probabilities for the invitees and the attendance probabilities for the one or more potential invitees; and
determine a difference between the target attendance for the virtual event and the predicted attendance for the virtual event.

16. The system of claim 15, wherein the one or more processors are further configured to cause the system to determine the set of client devices to provide the digital video for the virtual event by selecting, from ranking the potential invitees, a number of client devices corresponding to potential invitees that sum to at least the difference between the target attendance and the predicted attendance.

17. The system of claim 14, wherein the one or more processors are further configured to cause the system to:
receive an indication to prioritize a feature in utilizing the approximate nearest neighbor algorithm to determine distances between invitee vectors and potential invitee vectors within the vector space; and
in response to the indication to prioritize the feature, weight the feature more heavily within the approximate nearest neighbor algorithm.

18. The system of claim 14, wherein the one or more processors are further configured to cause the system to:
utilize the approximate nearest neighbor algorithm to determine the distances between the invitee vectors and the potential invitee vectors within the vector space based on a first set of features; and
determine probabilities that the invitees will attend the virtual event by applying the attendance prediction neural network on a second set of features.

19. The system of claim 14, wherein the one or more processors are further configured to cause the system to distribute electronic communications to invite the set of client devices to attend the virtual event.

20. The system of claim 14, wherein the one or more processors are further configured to cause the system to train the attendance prediction neural network to generate the predicted attendance probabilities using the training features and ground truth attendance information, wherein the attendance prediction neural network comprises a deep neural network.

* * * * *